US012634462B2

(12) United States Patent
Yang et al.

(10) Patent No.: US 12,634,462 B2
(45) Date of Patent: May 19, 2026

(54) ENCODING DEVICE AND OPERATION METHOD OF THE ENCODING DEVICE

(71) Applicant: Samsung Electronics Co., Ltd.,
Suwon-si (KR)

(72) Inventors: Jungyeop Yang, Suwon-si (KR);
Youngbeom Jung, Suwon-si (KR);
Jongseong Choi, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 0 days.

(21) Appl. No.: 18/927,178

(22) Filed: Oct. 25, 2024

(65) Prior Publication Data
US 2025/0203085 A1     Jun. 19, 2025

(30) Foreign Application Priority Data
Dec. 15, 2023     (KR) ........................ 10-2023-0183043

(51) Int. Cl.
*H04N 19/124*     (2014.01)
*H04N 19/176*     (2014.01)

(52) U.S. Cl.
CPC ......... *H04N 19/124* (2014.11); *H04N 19/176*
(2014.11)

(58) Field of Classification Search
CPC ........................... H04N 19/124; H04N 19/176
See application file for complete search history.

(56) References Cited

U.S. PATENT DOCUMENTS

| | | | |
|---|---|---|---|
| 7,593,582 B2 | 9/2009 | Govindaswamy et al. | |
| 7,792,193 B2 | 9/2010 | Tanizawa et al. | |
| 9,076,189 B2 | 7/2015 | Endo | |
| 10,958,912 B2 | 3/2021 | Park | |
| 2014/0286406 A1 | 9/2014 | Kim et al. | |
| 2022/0103820 A1* | 3/2022 | Bross | ..................... H04N 19/12 |
| 2024/0283959 A1* | 8/2024 | Zhao | ..................... H04N 19/44 |

FOREIGN PATENT DOCUMENTS

JP     4594561 B2     12/2010

OTHER PUBLICATIONS

Ishfaq Ahmad, et al. "An overview of rate control techniques in HEVC and SHVC video encoding," Multimedia Tools and Applications, Springer Nature, pp. 1-32 (2021).

* cited by examiner

*Primary Examiner* — Kathleen V Nguyen
(74) *Attorney, Agent, or Firm* — Fish & Richardson P.C.

(57)     ABSTRACT

An encoding device may include a quantization controller configured to generate, for each of basic blocks constituting image data, quantization parameters for each of a plurality of sample blocks for partitioning the basic blocks, and a quantizer configured to quantize the image data based on at least one of the quantization parameters, wherein the quantization controller is further configured to generate initial quantization offsets corresponding to preliminary blocks generated by partitioning the image data according to each of the plurality of sample blocks, generate final quantization offsets corresponding to the preliminary blocks by adjusting the initial quantization offsets to be included in offset ranges corresponding to the preliminary blocks, respectively, wherein the offset ranges are set based on sizes of the preliminary blocks, respectively, and generate the quantization parameters based on the final quantization offsets.

20 Claims, 17 Drawing Sheets

FIG. 15

ENCODING DEVICE AND OPERATION METHOD OF THE ENCODING DEVICE

CROSS-REFERENCE TO RELATED APPLICATION

This application is based on and claims priority under 35 U.S.C. § 119 to Korean Patent Application No. 10-2023-0183043, filed on Dec. 15, 2023, in the Korean Intellectual Property Office, the disclosure of which is incorporated by reference herein in its entirety.

BACKGROUND

The inventive concept relates to an encoding device, and more particularly, to an encoding device capable of adjusting a quantization offset based on an offset range according to the size of a preliminary block, and an operation method of the encoding device.

With the development and distribution of hardware capable of reproducing and storing high-resolution or high-definition video data, the need for video codecs for effectively encoding or decoding high-resolution or high-definition video data is increasing.

Video encoding may refer to a process of generating, from original data, encoded data with a smaller capacity than the original data, that is, video data consisting of image data or a series of image data. Decoded data generated by decoding encoded data or bitstream may be identical to or different from original data depending on the video encoding method. For example, data decoded from data encoded with lossless compression may be identical to original data, whereas data decoded from data encoded with lossy compression may be different from original data.

Reducing the size of encoded data through lossy compression, that is, the bit rate of a bitstream, while reducing the difference between decoded data and original data is one of the main challenges in video encoding.

Accordingly, a technique may be required to reduce distortion that occurs when encoding original data.

SUMMARY

Example embodiments discussed herein provide an encoding device capable of adjusting a quantization offset to be included in an offset range that varies depending on the size of a preliminary block such that the quantization offset is adjusted according to the size of the preliminary block, thereby improving image quality in encoding of image data, and an operation method of the encoding device.

According to an aspect of various example embodiments, there is provided an encoding device including a quantization controller configured to generate, for each of basic blocks constituting image data, quantization parameters for each of a plurality of sample blocks for partitioning the basic blocks, and a quantizer configured to quantize the image data based on at least one of the quantization parameters, wherein the quantization controller is further configured to generate initial quantization offsets corresponding to preliminary blocks generated by partitioning the image data according to each of the plurality of sample blocks, generate final quantization offsets corresponding to the preliminary blocks by adjusting the initial quantization offsets to be included in offset ranges corresponding to the preliminary blocks, respectively, wherein the offset ranges are set based on sizes of the preliminary blocks, respectively, and generate the quantization parameters based on the final quantization offsets.

According to another aspect of various example embodiments, there is provided an encoding device including a quantization controller configured to generate a quantization parameter corresponding to a block into which image data is partitioned, and a quantizer configured to quantize the image data based on the quantization parameter, wherein the quantization controller is further configured to generate a final quantization offset from an initial quantization offset corresponding to the block, based on an offset range corresponding to the block, and generate the quantization parameter based on the final quantization offset, and the offset range varies depending on a size of a block corresponding to the initial quantization offset.

According to another aspect of various example embodiments, there is provided an operation method of an encoding device for generating quantization parameters, the operation method including generating initial quantization offsets corresponding to preliminary blocks generated by partitioning image data according to each of a plurality of sample blocks, generating final quantization offsets corresponding to the preliminary blocks by adjusting the initial quantization offsets to be included in offset ranges corresponding to the preliminary blocks, respectively, and generating the quantization parameters based on the final quantization offsets, wherein the offset range varies depending on a size of the preliminary block.

BRIEF DESCRIPTION OF THE DRAWINGS

Embodiments will be more clearly understood from the following detailed description taken in conjunction with the accompanying drawings in which:

FIG. 15 is a diagram for describing operations of a quantizer according to an example embodiment;

DETAILED DESCRIPTION OF THE EMBODIMENTS

Figure 1:
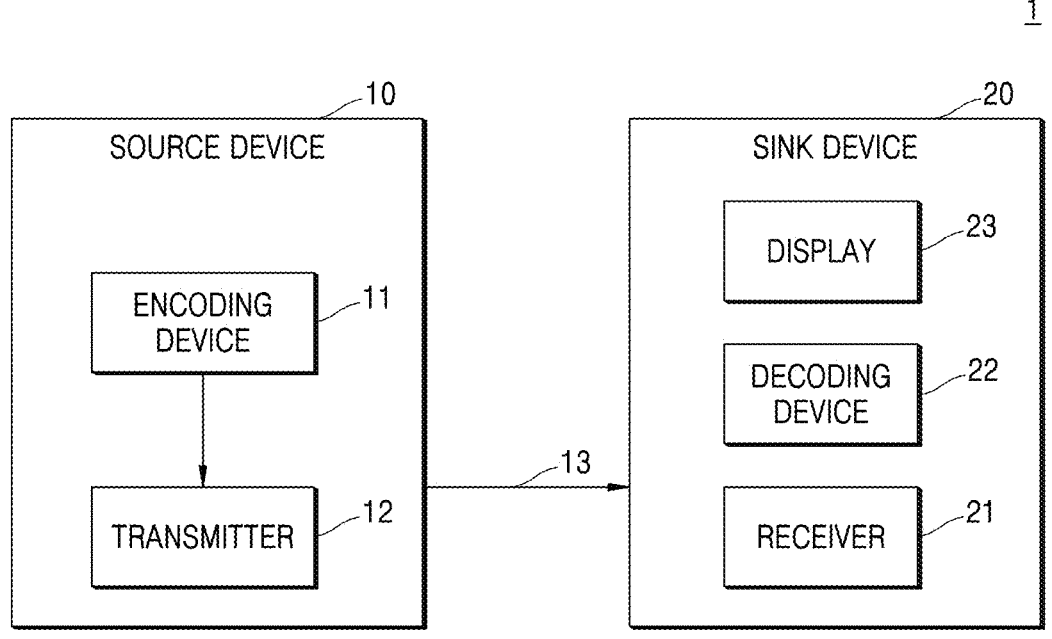
FIG. 1 is a diagram for describing a video system according to an example embodiment.

Hereinafter, embodiments will be described in detail with reference to the accompanying drawings. The same reference numerals are used for the same components in the drawings, and redundant descriptions thereof will be omitted.

FIG. 1 is a diagram for describing a video system according to an example embodiment.

Referring to FIG. 1, a video system 1 may include a source device 10 and a sink device 20. According to an example embodiment, the video system 1 may further include other general-purpose components in addition to the components illustrated in FIG. 1.

The source device 10 may include an encoding device 11 and a transmitter 12. The source device 10 may be an electronic device for generating image data (e.g., a moving image, a still image, or raw image data) or receiving image data. The source device 10 may be implemented in various forms, for example, an optical media reproduction device such as a digital video disc (DVD) or Blu-ray player, an ultra-high-definition (UHD) player, a set-top box, a television (TV), a computer, a mobile device, a home theater, a game console, or a content server.

The encoding device 11 may receive input data (e.g., a moving image, a still image, or raw image data as image data). For example, the encoding device 11 may receive image data from a video capture device such as a video camera or a video archive storing previously captured videos. However, various example embodiments are not limited thereto, and the encoding device 11 may receive image data from an external device such as a memory or a camera.

The image data may be a series of pieces of image frame data. The image data may include pixel values. The image data may be partitioned into a plurality of blocks having various sizes. For example, the blocks may have sizes of 128×128 pixels, 64×64 pixels, 32×32 pixels, 16×16 pixels, and 8×8 pixels, but are not limited thereto. The image data may be compressed and decompressed in units of blocks. For example, the image data may be compressed and decompressed in units of coding blocks cb of FIG. 5.

The encoding device 11 may encode the image data. For example, the encoding device 11 may perform lossy compression or lossless compression on the image data. Here, lossless compression refers to compression without loss of data, and refers to a method in which the compression rate varies depending on the data. In contrast, lossy compression refers to compression with loss of some data, and may have a higher compression rate than lossless compression, and may have a preset compression rate (e.g., a fixed compression rate). Lossy compression may include a quantization operation based on a quantization parameter, and at least one other compression process. As the quantization parameter increases, the amount of lost data may increase and quantization errors may occur.

The encoding device 11 may generate a quantization parameter. The encoding device 11 may generate quantization parameters corresponding to blocks into which the image data is partitioned (e.g., coding blocks or preliminary blocks to be described below). The image data may be partitioned into blocks having various block sizes, and the encoding device 11 may generate a quantization parameter corresponding to each block. The quantization parameter may be generated based on a quantization offset.

The encoding device 11 may generate a final quantization offset and generate a quantization parameter based on the final quantization offset. The encoding device 11 may generate a final quantization parameter corresponding to each block, and generate a quantization parameter corresponding to each block by using the final quantization parameter.

In an example embodiment, the encoding device 11 may generate a final quantization offset from an initial quantization offset corresponding to a block, based on an offset range corresponding to the block. An offset range corresponding to each block may be set. The encoding device 11 may generate a final quantization offset by adjusting the initial quantization offset to be included in the offset range corresponding to the block.

When the initial quantization offset is included in the offset range, the encoding device 11 may generate a final quantization offset as the initial quantization offset. For example, it is assumed that a first offset range and a first initial quantization offset correspond to a first block, and the first initial quantization offset is included in the first offset range. Because the first initial quantization offset is included in the first offset range, the encoding device 11 may generate a final quantization offset corresponding to the first block, as the first initial quantization offset.

When the initial quantization offset is not included in the offset range, the encoding device 11 may adjust the initial quantization offset by using the offset range. When the initial quantization offset is not included in the offset range, the encoding device 11 may generate a final quantization offset as a value closer to the initial quantization offset from among the maximum value and the minimum value of the offset range. For example, it is assumed that a second offset range and a second initial quantization offset correspond to a second block, and the second initial quantization offset is not included in the second offset range. Because the second initial quantization offset is not included in the second offset range, the encoding device 11 may adjust the second initial quantization offset. The encoding device 11 may generate a final quantization offset corresponding to the second block, as a value closer to the second initial quantization offset from among the maximum value and the minimum value of the second offset range.

The offset range corresponding to each block may be set based on the size of the block. The offset range corresponding to each block may vary depending on the size of the block. The size of the block may refer to the area of the block. As the size of the block increases, the difference between the maximum value and the minimum value of the offset range corresponding to the block may increase. For example, the size of the first block may be greater than the size of the second block, and the first offset range corresponding to the first block may be from a first value to a second value. The second offset range corresponding to the second block may be from a third value to a fourth value.

The difference between the second value and the first value may be greater than the difference between the fourth value and the third value.

As the size of each block increases, an offset range corresponding to the block may increase. In an example embodiment, as the size of a block increases, the absolute values of the maximum value and the minimum value of an offset range corresponding to the block may increase. For example, the absolute value of each of the first value and the second value may be greater than the absolute value of each of the third value and the fourth value.

In an example embodiment, offset ranges corresponding to blocks having the same size may be equal to each other. For example, when the third block and the fourth block have the same size, a third offset range corresponding to the third block and a fourth offset range corresponding to the fourth block may be equal to each other.

In an example embodiment, the offset range corresponding to each block may be set based on the size and shape of the block. The offset range corresponding to each block may vary depending on the size and shape of the block. For example, offset ranges corresponding to blocks having the same size and shape may be equal to each other. For example, when a fifth block and a sixth block have the same size and shape, a fifth offset range corresponding to the fifth block and a sixth offset range corresponding to the sixth block may be equal to each other. For example, when a seventh block and an eighth block have the same size and different shapes, a seventh offset range corresponding to the seventh block and an eighth offset range corresponding to the eighth block may be different from each other. In an example embodiment, an offset range corresponding to each block may be set based on a final quantization offset. The encoding device 11 may set an offset range of a target block based on a final quantization offset corresponding to a block other than the target block. The offset range of the target block may be set based on a final quantization offset corresponding to a block having a size greater than that of the target block.

The encoding device 11 may generate a final quantization offset by adjusting the initial quantization offset to be included in an offset range that varies depending on the size of the block, and generate a quantization parameter based on the final quantization offset. The encoding device 11 may generate a final quantization offset by adjusting an initial quantization offset to be included in an offset range, which increases as the size of the block increases, thereby reducing a variation in quantization offset between blocks and reducing distortion that occurs when encoding image data. The encoding device 11 may generate encoded image data based on a quantization parameter.

The encoded image data may be output in the form of a bitstream. Frames of the encoded image data may be output in the form of a bitstream. The encoding device 11 may operate according to a video compression scheme such as Advanced Video Coding (AVC), VP8, VP9, High Efficiency Video Coding (HEVC), AOMedia Video 1 (AV1), or AVS3.

The transmitter 12 may transmit a bitstream output from the encoding device 11 to a receiver 21 of the sink device 20, in the form of a file or streaming. For example, the transmitter 12 may transmit a bitstream output from the encoding device 11 to the receiver 21 through a communication channel 13.

The communication channel 13 may transmit, to the receiver 21, image data encoded by the source device 10.

The communication channel 13 may include any wireless or wired communication medium, such as a radio-frequency (RF) spectrum, one or more physical transmission lines, or any combination of wireless and wired media. The communication channel 13 may constitute part of a packet-based network, such as a local area network, a wide-area network, or a global network such as the Internet. The communication channel 13 generally represents any suitable communication medium or collection of different communication media, for transmitting encoded image data from the source device 10 to the receiver 21.

The sink device 20 may include the receiver 21, a decoding device 22, and a display 23. The sink device 20 may be an electronic device for processing and reproducing image data (e.g., encoded image data) transmitted from the source device 10. Here, the term "reproduction" may refer to displaying an image according to processed image data, outputting an audio according to processed audio data, or displaying and outputting an image and an audio according to processed image data and audio data. The sink device 20 may be implemented in various forms such as a TV, a monitor, a portable multimedia player, a mobile phone, a tablet, an electronic picture frame, an electronic blackboard, or an electronic advertising board.

Although FIG. 1 illustrates that the encoding device 11 is included in the source device 10 and the decoding device 22 is included in the sink device 20, various example embodiments are not limited thereto, and the encoding device 11 and the decoding device 22 may be included in the source device 10 and/or the sink device 20. In addition, the encoding device 11 and the decoding device 22 may constitute a codec.

The receiver 21 may receive a bitstream containing encoded image data from the source device 10 through the communication channel 13.

The transmitter 12, the communication channel 13, and the receiver 21 may be configured for communication according to any wired or wireless communication system, including one or more of a Ethernet, telephone, cable, power-line, and fiber optic systems, and/or a wireless system including one or more of a code-division multiple access (CDMA or CDMA2000) communication system, a frequency-division multiple access (FDMA) system, an orthogonal frequency-division multiplexing (OFDM) access system, a time-division multiple access (TDMA) system such as a Global System for Mobile Communications (GSM) system, General Packet Radio Service (GPRS), or enhanced data GSM environment (EDGE), a Terrestrial Trunked Radio (TETRA) mobile telephone system, a wide-band code division multiple access (WCDMA) system, a high data rate 1×EV-DO (first-generation evolution data only) or 1×EV-DO Gold Multicast system, an IEEE 802.18 system, a MediaFLO™ system, a DMB system, a DVB-H system, or another scheme for data communication between two or more devices.

The decoding device 22 may receive a bitstream from the source device 10 and decode the bitstream. The decoding device 22 may decompress the bitstream and generate decoding data. The decoding device 22 may operate according to a video compression scheme such as AVC, VP8, VP9, HEVC, AV1, or AVS3. For example, the decoding device 22 may receive and decode image data that is encoded according to AVS3.

The sink device 20 may display the decoded data to a user through the display 23. The display 23 may include various display devices, such as a cathode-ray tube (CRT) display, a liquid-crystal display (LCD), a plasma display, a light-emitting diode (LED) display, an organic LED display, or other types of display units.

Each of the encoding device 11 and the decoding device 22 may be implemented as one or more microprocessors, digital signal processors (DSPs), application-specific integrated circuits (ASICs), field-programmable gate arrays (FPGAs), distributed logic, software, hardware, firmware, or any combination thereof. Each of the encoding device 11 and the decoding device 22 may be included in one or more encoders or decoders, either of which is integrated as part of a combined encoder/decoder (CODEC) in a respective mobile device, subscriber device, broadcasting device, server, or the like.

Each of the source device 10 and the sink device 20 may include appropriate modulation, demodulation, frequency conversion, filtering, and amplifier components for transmission and reception of encoded video, which include RF wireless components and antennas sufficient to support wireless communication. For example, the components may be used as the transmitter 12 and the receiver 21.

Figure 2:
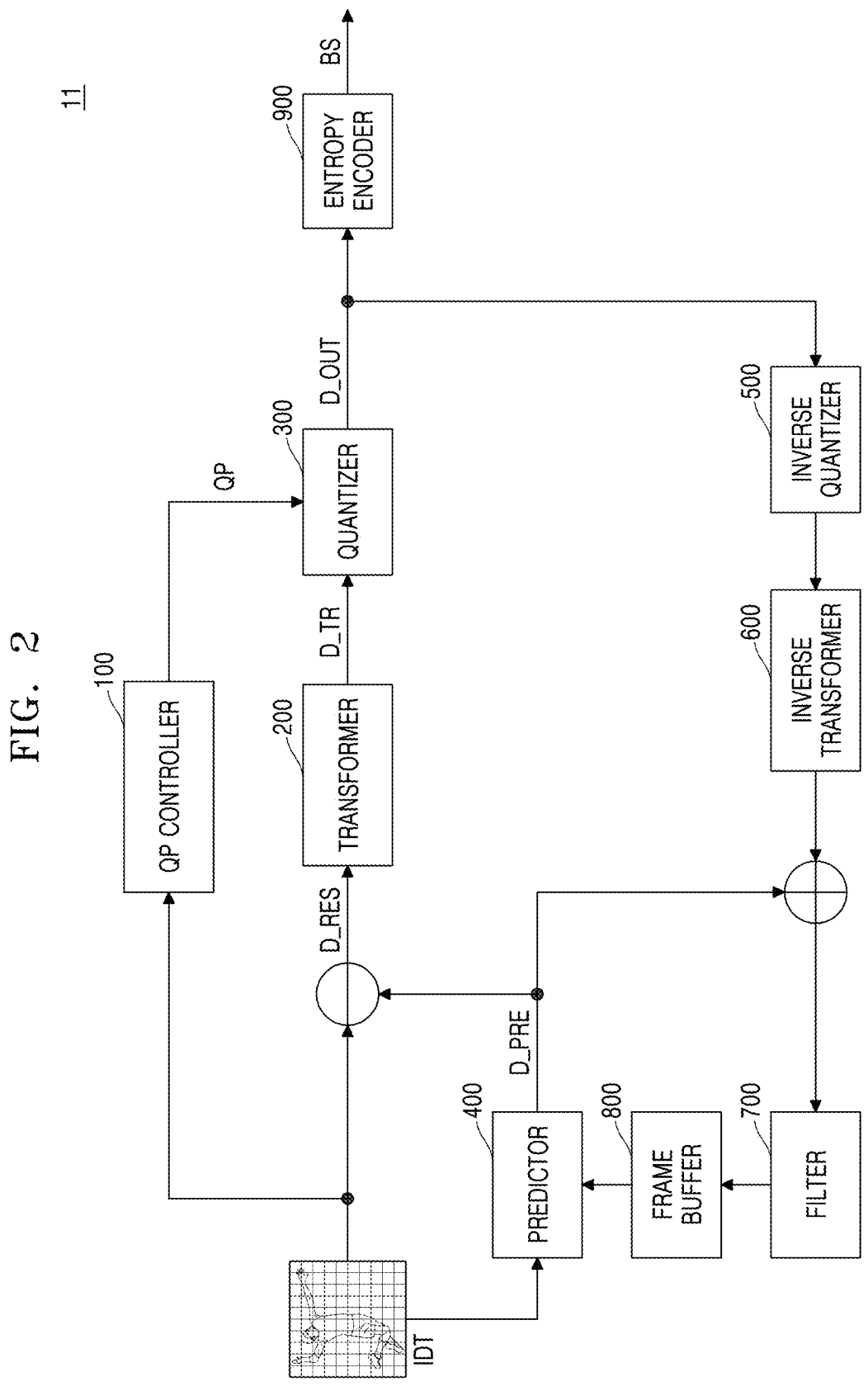
FIG. 2 is a block diagram illustrating an encoding device according to an example embodiment.

FIG. 2 is a block diagram illustrating an encoding device according to an example embodiment. The encoding device 11 of FIG. 2 corresponds to the encoding device 11 of FIG. 1, and thus, redundant descriptions thereof will be omitted.

The encoding device 11 may be any one of various devices for processing image data IDT. For example, the encoding device 11 may be a device including a display for outputting the image data IDT, such as a mobile phone, a desktop personal computer (PC), a laptop PC, or a tablet PC, may be a device including a camera module for generating the image data IDT, such as a digital camera, a digital camcorder, or a smart phone, or may be a server for performing encoding to transmit data through a communication channel such as a network. In addition, the encoding device 11 may be implemented as one or more semiconductor chips as components included in the above-mentioned devices, and may also include a computer-readable storage medium having recorded thereon software including instructions to be executed by a central processing unit (CPU), a graphics processing unit (GPU), or the like to perform encoding.

FIG. 2 illustrates at least some of modules included in the encoding device 11, and the encoding device 11 may generate encoded data, that is, a coded bitstream BS, by encoding the image data IDT. The encoding device 11 may include a plurality of modules, that is, a quantization controller 100, a transformer 200, a quantizer 300, a predictor 400, an inverse quantizer 500, an inverse transformer 600, a filter 700, a frame buffer 800, and an entropy encoder 900, and may include calculation blocks configured to perform addition or subtraction of data.

The image data IDT may be input to the encoding device 11. The image data IDT may be encoded in units of blocks, and the blocks may have various sizes. For example, the image data IDT may be encoded in units of coding blocks. The image data IDT may be input to modules included in the encoding device 11, in units of coding blocks. However, various example embodiments are not limited thereto, and the image data IDT may be input to the quantization controller 100 in units of basic blocks, and may be encoded in units of coding blocks. Residual data D_RES may be input to the transformer 200. The residual data D_RES may be a difference between the image data IDT received by the encoding device 11, and prediction data D_PRE. The transformer 200 may generate transformed data D_TR by transforming the residual data D_RES. For example, the transformer 200 may generate the transformed data D_TR by performing a discrete cosine transform (DCT) on the residual data D_RES, and accordingly, the transformed data D_TR in a spatial domain may be transformed to the transformed data D_TR in a frequency domain.

The quantizer 300 may generate output data D_OUT by quantizing the transformed data D_TR. For example, the quantizer 300 may quantize the transformed data D_TR according to a quantization parameter QP. The quantizer 300 may receive the quantization parameter QP from the quantization controller 100. The quantizer 300 may receive quantization parameters QP corresponding to blocks into which the image data IDT is partitioned.

The quantizer 300 may allocate corresponding quantization parameters QP to a plurality of blocks (e.g., coding blocks or preliminary blocks) of the image data IDT, respectively, and perform quantization on the image data IDT based on the quantization parameters QP. For example, the quantizer 300 may quantize the transformed data D_TR by using a quantization matrix, and a quantization level of the transformed data D_TR may be adjusted by determining the quantization matrix according to the quantization parameters QP.

The quantization controller 100 may generate the quantization parameter QP for improving the actual video quality of encoded data generated from the output data D_OUT, that is, data decoded from a bitstream BS. The output data D_OUT may be output as a bitstream BS through the entropy encoder 900. The quantization controller 100 may generate quantization parameters QP corresponding to blocks into which image data is partitioned (e.g., coding blocks or preliminary blocks). The quantization parameter QP may be generated based on a quantization offset.

In an example embodiment, for each of basic blocks constituting the image data IDT, the quantization controller 100 may generate a quantization parameter QP for each of a plurality of sample blocks. The basic block may refer to a block unit for the quantization controller 100 to generate a quantization parameter QP. The sample block refers to a block for partitioning the basic block, and may include blocks having a size less than or equal to the size of the basic block. Preliminary blocks may be generated by partitioning the image data IDT according to a sample block. The quantization controller 100 may generate preliminary blocks by partitioning the image data IDT according to each of the sample blocks.

For example, the sample blocks may include a first sample block having the same size as the basic block, a second sample block having a smaller size than the first sample block, and a third sample block having a smaller size than the second sample block. First preliminary blocks may be generated by partitioning the image data IDT according to the first sample block, second preliminary blocks may be generated by partitioning the image data IDT according to the second sample block, and third preliminary blocks may generated by partitioning the image data IDT according to the third sample block. In the above example, it is described that the preliminary blocks are generated based on three sample blocks, but various example embodiments are not limited thereto, and various types of sample blocks may be used. The sample blocks may include sample blocks having the same size and different shapes. The image data IDT may be input to the quantization controller 100 in units of basic blocks. However, various example embodiments are not limited thereto, and the residual data D_RES may be input to the quantization controller 100 in units of basic blocks.

When the image data IDT in units of basic blocks is input to the quantization controller 100, the quantization controller 100 may generate quantization parameters QP corresponding to preliminary blocks that are generated by partitioning a basic block according to each of a plurality of sample blocks. This will be described below with reference to FIG. 6.

The inverse quantizer 500 and the inverse transformer 600 may perform inverses of operations of the quantizer 300 and the transformer 200, respectively. For example, the inverse quantizer 500 may inversely quantize the output data D_OUT, and the inverse transformer 600 may inversely transform data generated by the inverse quantizer 500, that is, data in a frequency domain, to generate data in a spatial domain. Data generated by the inverse transformer 600 may be reconstructed residual data.

The filter 700 and the frame buffer 800 may generate and store decoded frame data for inter prediction. The filter 700 may filter data obtained by summing up the prediction data D_PRE and the residual data reconstructed by the inverse quantizer 500 and the inverse transformer 600, accordingly, errors caused by blocks constituting one frame may be reduced, and thus, frame data representing a more realistic image may be generated. The frame buffer 800 may store the frame data generated by the filter 700 and provide the stored frame data to the predictor 400.

The predictor 400 may perform intra prediction and/or inter prediction. For example, the predictor 400 may include an intra prediction module configured to perform intra prediction on the image data IDT, and an inter prediction module configured to perform inter prediction on the image data IDT. The intra prediction module may generate intra prediction data based on the image data IDT and the data obtained by summing up the prediction data D_PRE and the residual data reconstructed by the inverse quantizer 500 and the inverse transformer 600. For example, the intra prediction module may generate the intra prediction data by performing intra-frame estimation and intra-frame prediction.

The inter prediction module may generate inter prediction data based on the image data IDT and the frame data provided from the frame buffer 800. For example, the inter prediction module may generate the inter prediction data by performing motion estimation and motion compensation. One of the intra prediction data and the inter prediction data may be selected as the prediction data D_PRE and used to generate the residual data D_RES from the image data IDT.

The image data IDT including a plurality of frames may be encoded for each block (e.g., coding block) for each frame, and accordingly, the prediction data D_PRE, the residual data D_RES, the transformed data D_TR, and the output data D_OUT may correspond to one block (e.g., coding block). The quantization controller 100 may generate quantization parameters QP corresponding to blocks (e.g., coding blocks or preliminary blocks). That is, the quantization parameters QP may be generated to have different values for the blocks (e.g., coding blocks or preliminary blocks), respectively. According to an example embodiment, the quantization controller 100 may, for a basic block, partition the basic block according to each of a plurality of sample blocks, and generate a quantization parameter QP for the size of each sample block. The quantizer 300 may select a quantization parameter QP corresponding to a block for encoding the image data IDT from among quantization parameters QP corresponding to preliminary blocks, and perform quantization.

Figure 3:
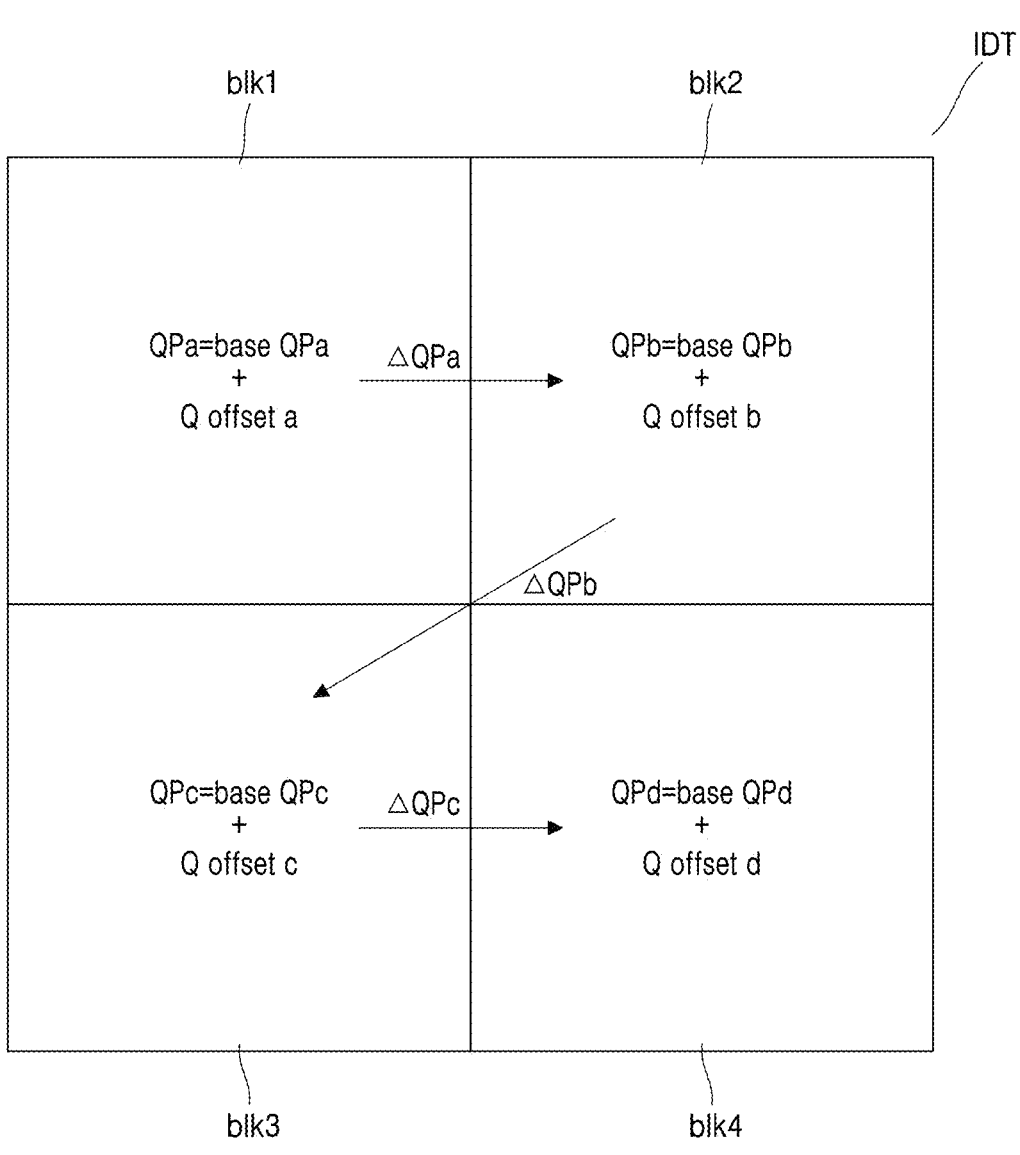
FIG. 3 is a diagram for describing quantization parameters according to an example embodiment.

FIG. 3 is a diagram for describing quantization parameters according to an example embodiment.

Referring to FIG. 3, image data IDT may be partitioned into a first block blk1, a second block blk2, a third block blk3, and a fourth block blk4. Although FIG. 3 illustrates that the image data IDT is partitioned into blocks having the same size, various example embodiments are not limited thereto, and the image data IDT may be partitioned into blocks having different sizes. The first block blk1, the second block blk2, the third block blk3, and the fourth block blk4 may be sequentially encoded. A first quantization parameter QPa may correspond to the first block blk1, a second quantization parameter QPb may correspond to the second block blk2, a third quantization parameter QPc may correspond to the third block blk3, and a fourth quantization parameter QPd may correspond to the fourth block blk4.

The quantization parameter may be generated based on a base quantization parameter and a quantization offset. For example, the quantization parameter may be generated by summing up the base quantization parameter and the quantization offset. For example, the first quantization parameter QPa may be a sum of a first base quantization parameter base QPa and a first quantization offset Q offset a. The second quantization parameter QPb may be a sum of a second base quantization parameter base QPb and a second quantization offset Q offset b.

When an encoding device (e.g., the encoding device 11 of FIG. 1) encodes a quantization parameter, a variation in quantization parameter between blocks may be coded. In example, a first quantization parameter variation $\Delta$QPa, a second quantization parameter variation $\Delta$QPb, and a third quantization parameter variation $\Delta$QPc may be compressed. The first quantization parameter variation $\Delta$QPa may be a difference between the first quantization parameter QPa and the second quantization parameter QPb, the second quantization parameter variation $\Delta$QPb may be a difference between the second quantization parameter QPb and the third quantization parameter QPc, and the third quantization parameter variation $\Delta$QPc may be a difference between the third quantization parameter QPc and the fourth quantization parameter QPd. As the quantization parameter variation increases, the amount of data increases and an evaluation value may decrease.

An objective evaluation value and a subjective evaluation value may be used in video quality evaluation or distortion measurement. The objective evaluation value may be based on a pixel pointwise error of video data. The objective evaluation value may include a mean square error (MSE), a mean absolute error (MAE), a peak signal-to-noise ratio (PSNR), a root mean squared error (RMSE), a signal-to-noise ratio (SNR), and the like. The subjective evaluation value may be based on content represented by video data. For example, the subjective evaluation value may include structural similarity index measure (SSIM), multi-scale SSIM (MS-SSIM), and the like.

An encoding device of various example embodiments may adjust a quantization offset by limiting a range of the quantization offset corresponding to each block, and accordingly, a variation in quantization parameter may be limited. Thus, the amount of encoded data may be reduced, and an objective evaluation value and a subjective evaluation value may be improved.

Figure 4:
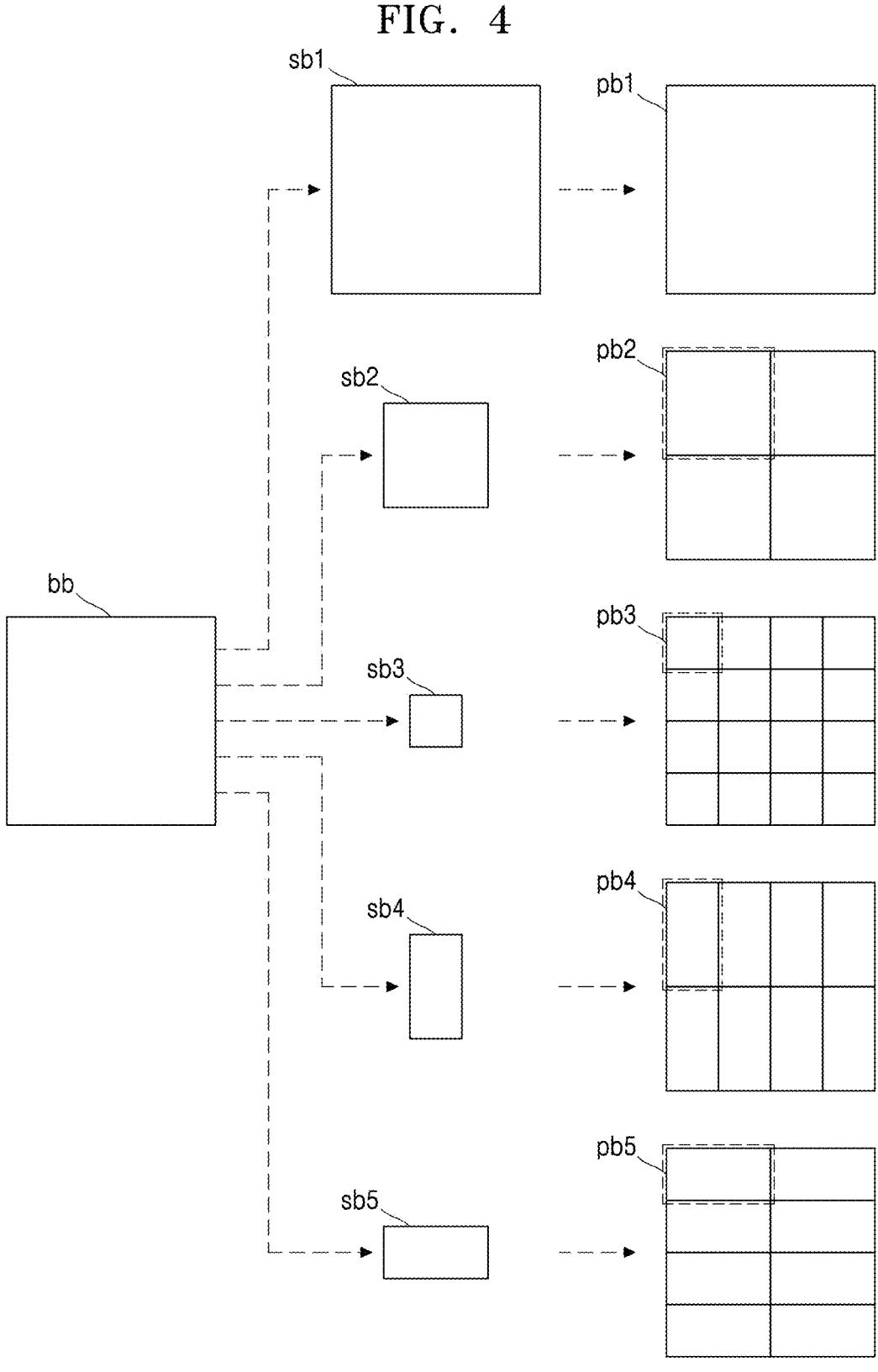
FIG. 4 is a diagram for describing a basic block, sample blocks, and preliminary blocks according to an example embodiment.

FIG. 4 is a diagram for describing a basic block, sample blocks, and preliminary blocks according to an example embodiment.

A basic block bb may be partitioned according to each of a plurality of sample blocks sb1, sb2, sb3, sb4, and sb5. The sample blocks may have various sizes. For example, the sample blocks may have sizes of N×N (N is a positive number), N×2N, 2N×N, 4N×N, N×4N, and the like. For example, the sample blocks may have various sizes, for example, pixel sizes of 4×4, 4×8, 4×16, 8×4, 16×4, 8×8, 8×16, 8×32, 16×8, 32×8, 16×16, 16×32, 16×64, 32×16, 64×16, 32×32, 32×64, 32×128, 64×32, 128×32, 64×64, 64×128, 128×64, and 128×128. FIG. 4 illustrates five sample blocks, but this is only for convenience of drawing, and various example embodiments are not limited thereto.

In an example embodiment, the plurality of sample blocks sb1, sb2, sb3, sb4, and sb5 may have sizes less than or equal to the size of the basic block bb. For example, a quantization controller (e.g., the quantization controller 100 of FIG. 2) may generate a first preliminary block pb1 by partitioning the basic block bb according to the first sample block sb1. The size of the first sample block sb1 may be equal to the size of the basic block bb. The size of the first preliminary block pb1 may be equal to the size of the basic block bb. For example, the size of the basic block bb may be 32×32 pixels, and the size of the first preliminary block pb1 may be 32×32 pixels.

The quantization controller 100 may generate second preliminary blocks pb2 by partitioning the basic block bb according to the second sample block sb2. The size of the second sample block sb2 may be smaller than the size of the first sample block sb1. The size of the second preliminary block pb2 may be equal to the size of the second sample block sb2. For example, the size of the second preliminary block pb2 may be 16×16 pixels.

The quantization controller 100 may generate third preliminary blocks pb3 by partitioning the basic block bb according to the third sample block sb3. The size of the third sample block sb3 may be smaller than the size of the second sample block sb2. The size of the third preliminary block pb3 may be equal to the size of the third sample block sb3. For example, the size of the third preliminary block pb3 may be 8×8 pixels.

The quantization controller 100 may generate fourth preliminary blocks pb4 by partitioning the basic block bb according to the fourth sample block sb4. The size of the fourth sample block sb4 may be smaller than the size of the second sample block sb2. The size of the fourth preliminary block pb4 may be equal to the size of the fourth sample block sb4. For example, the size of the fourth preliminary block pb4 may be 8×16 pixels.

The quantization controller 100 may generate fifth preliminary blocks pb5 by partitioning the basic block bb according to the fifth sample block sb5. The size of the fifth sample block sb5 may be equal to the size of the fourth sample block sb4. The shape of the fifth sample block sb5 may be different from the shape of the fourth sample block sb4. The shape of the fifth sample block sb5 may be a rectangular shape with a horizontal length longer than the vertical length, and the shape of the fourth sample block sb4 may be a rectangular shape with a vertical length longer than the horizontal length. The fifth preliminary block pb5 and the fifth sample block sb5 may have the same size and shape. For example, the size of the fifth preliminary block pb5 may be 16×8 pixels.

The quantization controller 100 may generate quantization parameters for the plurality of sample blocks, respectively. The quantization controller 100 may generate quantization parameters corresponding to the preliminary blocks, respectively. For example, the quantization controller 100 may generate a quantization parameter corresponding to the first preliminary block pb1, generate quantization parameters corresponding to the second preliminary blocks pb2, generate quantization parameters corresponding to the third preliminary blocks pb3, generate quantization parameters corresponding to the fourth preliminary blocks pb4, and generate quantization parameters corresponding to the fifth preliminary blocks pb5.

Figure 5:
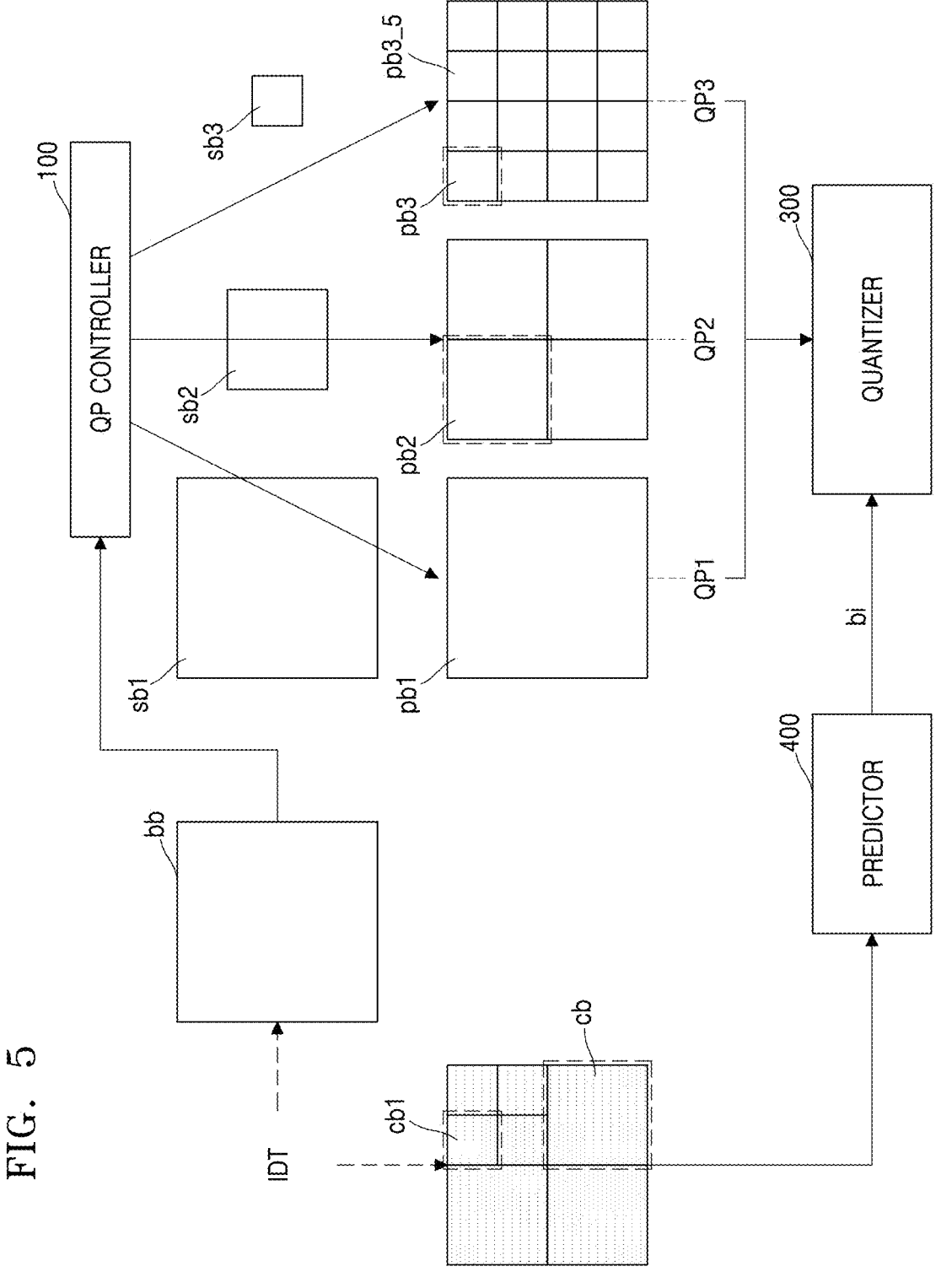
FIG. 5 is a diagram for describing operations of an encoding device according to an example embodiment.

FIG. 5 is a diagram for describing operations of an encoding device according to an example embodiment. In FIG. 5, it is assumed that three sample blocks are used. Descriptions that are already provided above will be omitted.

For each of basic blocks bb constituting image data IDT, the quantization controller 100 may generate quantization parameters QP1, QP2, and QP3. The quantization controller 100 may partition the basic block bb according to each of a plurality of sample blocks sb1, sb2, and sb3. In an example embodiment, the plurality of sample blocks sb1, sb2, and sb3 may have sizes less than or equal to the size of the basic block bb. For example, the quantization controller 100 may generate a first preliminary block pb1 by partitioning the basic block bb according to the first sample block sb1. The size of the first sample block sb1 may be equal to the size of the basic block bb. The size of the first preliminary block pb1 may be equal to the size of the basic block bb. For example, the size of the basic block bb may be 32×32 pixels, and the size of the first preliminary block pb1 may be 32×32 pixels.

The quantization controller 100 may generate second preliminary blocks pb2 by partitioning the basic block bb according to the second sample block sb2. The size of the second sample block sb2 may be smaller than the size of the first sample block sb1. For example, the size of the second preliminary block pb2 may be 16×16 pixels. Four second preliminary blocks pb2 may be generated by partitioning the basic block bb according to the second sample block sb2. The quantization controller 100 may generate third preliminary blocks pb3 by partitioning the basic block bb according to the third sample block sb3. The size of the third sample block sb3 may be smaller than the size of the second sample block sb2. For example, the size of the third preliminary block pb3 may be 8×8 pixels. The basic block bb may be partitioned into 16 third preliminary blocks pb3.

The quantization controller 100 may generate quantization parameters for the plurality of sample blocks, respectively. The quantization controller 100 may generate quantization parameters corresponding to the preliminary blocks, respectively. For example, the quantization controller 100 may generate a first quantization parameter QP1 corresponding to the first preliminary block pb1. The quantization controller 100 may generate one first quantization parameter QP1. The quantization controller 100 may generate second quantization parameters QP2 corresponding to the second preliminary blocks pb2, respectively. The quantization controller 100 may generate four second quantization parameters QP2. The quantization controller 100 may generate third quantization parameters QP3 corresponding to the third preliminary blocks pb3, respectively. The quantization controller 100 may generate 16 third quantization parameters QP3. The first quantization parameter QP1, the second quantization parameters QP2, and the third quantization parameters QP3 respectively corresponding to the preliminary blocks for the sizes of the respective preliminary blocks may be delivered to the quantizer 300.

The encoding device 11 may partition the image data IDT into coding blocks cb, and perform an encoding operation. The coding blocks cb are units in which the image data IDT is encoded, and may have various sizes. In FIG. 5, quadrangles partitioning the hatched area may each represent one coding block cb. The predictor 400 may perform a prediction process on each of coding blocks cb constituting the image data IDT. The predictor 400 may deliver block information bi to the quantizer 300. For example, the block information bi may include information indicating the size of a coding block and its position in the image data IDT.

In an example embodiment, the quantizer 300 may allocate the quantization parameters QP1, QP2, and QP3 to the corresponding coding blocks based on the block information bi. The quantizer 300 may allocate a quantization parameter corresponding to each coding block among the quantization parameters QP1, QP2, and QP3. The quantizer 300 may identify the positions and sizes of the coding blocks based on the block information bi, and may match a target coding block to one of the preliminary blocks to allocate a quantization parameter corresponding to the coding block. For example, when the target coding block is a first coding block cb1, the first coding block cb1 corresponds to a third preliminary block pb3_5, and thus, the quantizer 300 may allocate the third quantization parameter QP3 corresponding to the third preliminary block pb3_5, as a quantization parameter of the first coding block cb1. The quantizer 300 may quantize the target coding block by using the quantization parameter allocated to the target coding block.

Figure 6:
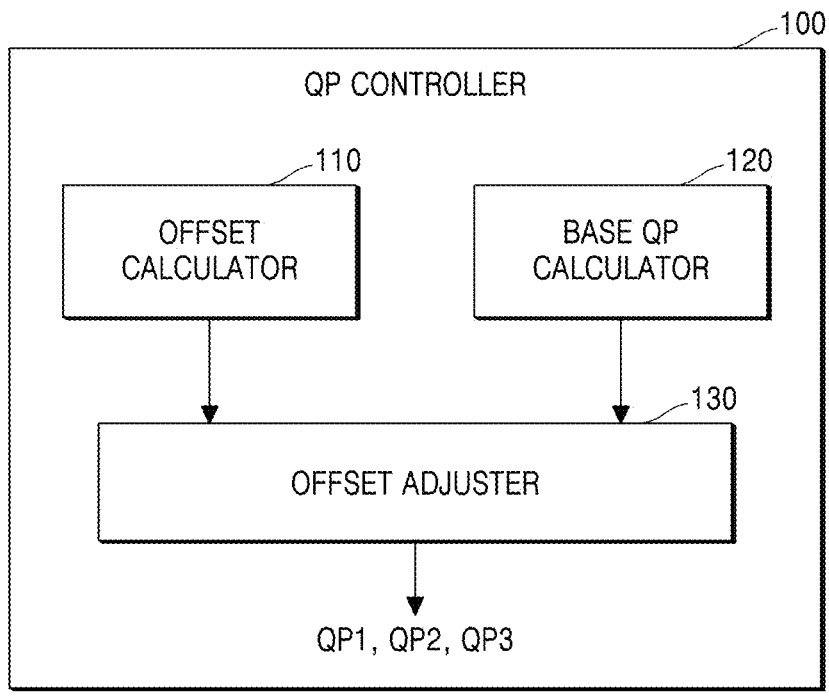
FIG. 6 is a block diagram for describing a quantization controller according to an example embodiment.

FIG. 6 is a block diagram for describing a quantization controller according to an example embodiment. Descriptions that are already provided above will be omitted.

Referring to FIG. 5, the quantization controller 100 may include an offset calculator 110, a base quantization parameter calculator 120, and an offset adjuster 130. The quantization controller 100 may generate quantization parameters QP1, QP2, and QP3. The quantization parameter may be generated based on a base quantization parameter and a quantization offset.

The offset calculator 110 may generate initial quantization offsets. The offset calculator 110 may generate initial quantization offsets corresponding to preliminary blocks, respectively. For example, the offset calculator 110 may generate the initial quantization offsets based on importance.

In an example embodiment, the offset calculator 110 may generate the initial quantization offsets corresponding to the preliminary blocks, respectively, based on the variance of pixel values included in each of the preliminary blocks. However, various example embodiments are not limited thereto, and the offset calculator 110 may generate the initial quantization offsets by using an average value of the pixel values included in each of the preliminary blocks. For example, the offset calculator 110 may generate the initial quantization offsets based on a preset equation.

The base quantization parameter calculator 120 may generate base quantization parameters. The base quantization parameter calculator 120 may generate base quantization parameters corresponding to the preliminary blocks, respectively. An amount of data allocated for coding the current frame is determined, and the base quantization parameter may refer to a quantization parameter required to satisfy the amount of data. For example, the base quantization parameter calculator 120 may generate the base quantization parameters based on a preset equation.

The offset adjuster 130 may generate final quantization offsets. The offset adjuster 130 may generate final quantization offsets corresponding to the preliminary blocks, respectively, by adjusting the initial quantization offsets corresponding to the preliminary blocks, to be included in offset ranges according to corresponding preliminary block sizes, respectively. For example, the offset adjuster 130 may generate a final quantization offset corresponding to a first preliminary block, by adjusting the initial quantization offset corresponding to the first preliminary block such that the initial quantization offset is included in a first offset range corresponding to the first preliminary block. The offset range may vary depending on the size of the preliminary block. The offset range will be described in detail below with reference to FIGS. 6 and 7.

In an example embodiment, when an initial quantization offset corresponding to a target preliminary block is included in an offset range corresponding to the target preliminary block, the offset adjuster 130 may generate a final quantization offset corresponding to the target preliminary block, as the initial quantization offset corresponding to the target preliminary block. For example, when the target preliminary block is the first preliminary block, and the first initial quantization offset corresponding to the first preliminary block is included in the first offset range, the offset adjuster 130 may generate a final quantization offset corresponding to the first preliminary block, as the first initial quantization offset.

In an example embodiment, when an initial quantization offset corresponding to a target preliminary block is not included in an offset range corresponding to the target preliminary block, the offset adjuster 130 may adjust the initial quantization offset corresponding to the target preliminary block by using the offset range corresponding to the target preliminary block. For example, it is assumed that the target preliminary block is the first preliminary block. When the first initial quantization offset is not included in the first offset range, the offset adjuster 130 may generate a final quantization offset corresponding to the first preliminary block, as a value closer to the first initial quantization offset from among the maximum value and the minimum value of the first offset range.

The offset adjuster 130 may generate the quantization parameters QP1, QP2, and QP3 based on the generated final quantization offsets and the base quantization parameters. For example, the offset adjuster 130 may generate each of the quantization parameters QP1, QP2, and QP3 respectively corresponding to the preliminary blocks by summing up the final quantization offset corresponding to each of the preliminary blocks and the base quantization parameter corresponding to each of the preliminary blocks.

Figure 7:
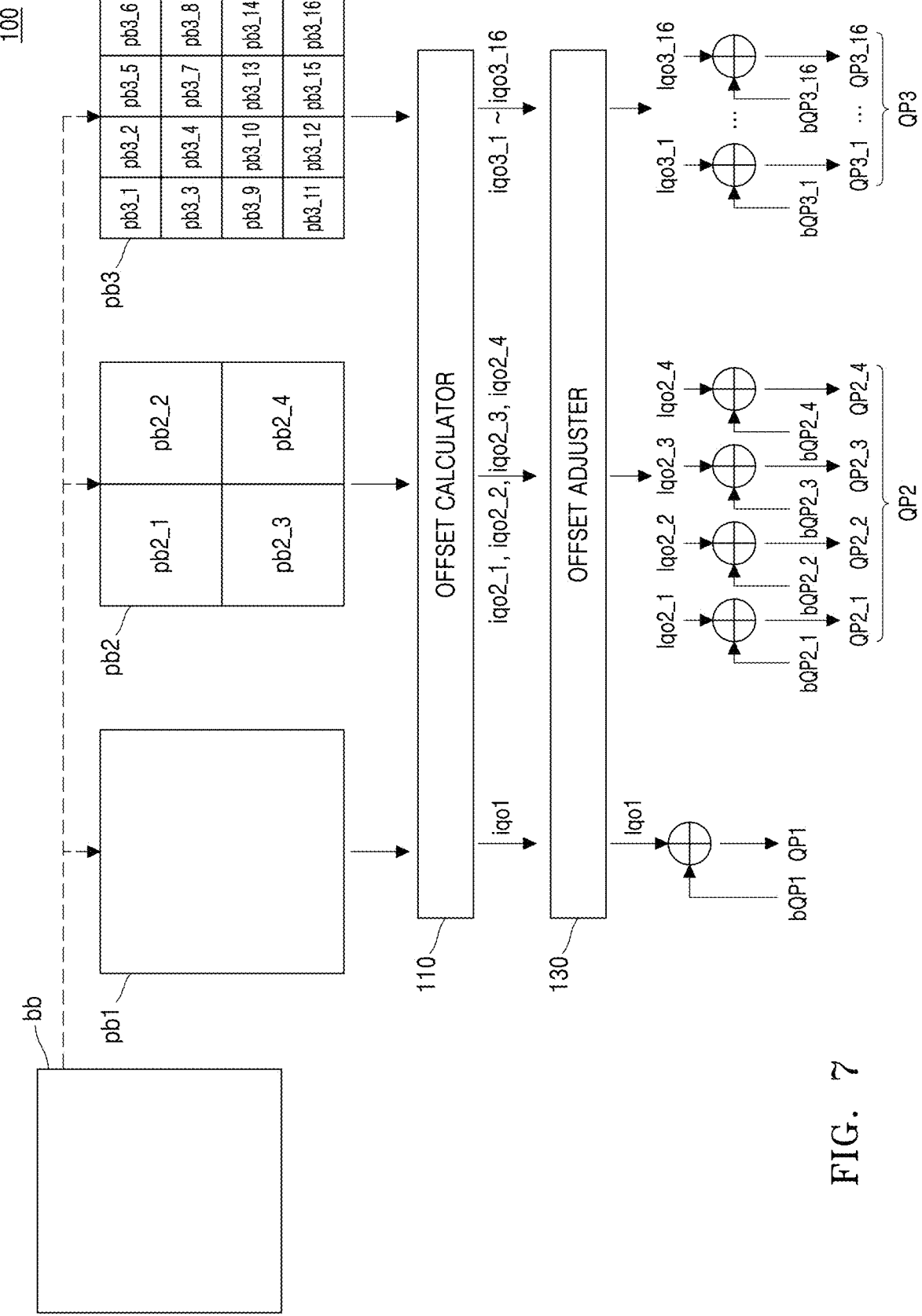
FIG. 7 is a diagram for describing operations of a quantization controller according to an example embodiment.

FIG. 7 is a diagram for describing operations of a quantization controller according to an example embodiment. Descriptions that are already provided above will be omitted. In FIG. 7, as in FIG. 5, it is assumed that a basic block bb is partitioned according to each of a first sample block, a second sample block, and a third sample block.

The quantization controller 100 may generate quantization parameters QP1, QP2, and QP3, for each basic block bb. The quantization controller 100 may generate a first preliminary block pb1 by partitioning the basic block bb according to the first sample block. The quantization controller 100 may generate second preliminary blocks pb2 by partitioning the basic block bb according to the second sample block. The basic block bb may be partitioned into a second preliminary block pb2_1, a second preliminary block pb2_2, a second preliminary block pb2_3, and a second preliminary block pb2_4. The quantization controller 100 may generate third preliminary blocks pb3 by partitioning the basic block bb according to the third sample block. The basic block bb may be partitioned into 16 third preliminary blocks pb3_1 to pb3_16.

The offset calculator 110 may generate initial quantization offsets. The offset calculator 110 may generate initial quantization offsets corresponding to preliminary blocks, respectively. The offset calculator 110 may generate a first initial quantization offset iqo1 corresponding to the first preliminary block pb1. The offset calculator 110 may generate a second initial quantization offset iqo2_1 corresponding to the second preliminary block pb2_1, a second initial quantization offset iqo2_2 corresponding to the second preliminary block pb2_2, a second initial quantization offset iqo2_3 corresponding to the second preliminary block pb2_3, and a second initial quantization offset iqo2_4 corresponding to the second preliminary block pb2_4. The offset calculator 110 may generate third initial quantization offsets iqo3_1 to iqo3_16 corresponding to the third preliminary blocks pb3_1 to pb3_16, respectively.

The offset adjuster 130 may adjust the initial quantization offsets. The offset adjuster 130 may adjust each of the initial quantization offsets to be included in an offset range corresponding to the preliminary block. The offset adjuster 130 may generate a first final quantization offset lqo1 by adjusting the first initial quantization offset iqo1 to be included in a first offset range corresponding to the first preliminary block pb1. The offset adjuster 130 may generate a second final quantization offset lqo2_1 by adjusting the second initial quantization offset iqo2_1 to be included in a second offset range corresponding to the second preliminary block pb2_1. In a similar manner, the offset adjuster 130 may generate a second final quantization offset lqo2_2, second final quantization offset lqo2_3, and second final quantization offset lqo2_4, for the second initial quantization offset iqo2_2, the second initial quantization offset iqo2_3, and the second initial quantization offset iqo2_4, respectively. The offset adjuster 130 may generate a third final quantization offset lqo3_1 by adjusting the third initial quantization offset iqo3_1 to be included in a third offset range corresponding to the third preliminary block pb3_1. In a similar manner, the offset adjuster 130 may generate third final quantization offsets lqo3_2 to lqo3_16, for the third initial quantization offsets iqo3_2 to iqo3_16, respectively.

The offset adjuster 130 may generate a first quantization parameter QP1 by summing up the first final quantization offset lqo1 and a first base quantization parameter bQP1 corresponding to the first preliminary block pb1. The first quantization parameter QP1 may correspond to the first preliminary block pb1. The offset adjuster 130 may generate a second quantization parameter QP2_1 by summing up the second final quantization offset lqo2_1 and a second base quantization parameter bQP2_1 corresponding to the second preliminary block pb2_1. The second quantization parameter QP2_1 may correspond to the second preliminary block pb2_1. The offset adjuster 130 may generate other quantization parameters similarly to the method described above.

Figure 8:
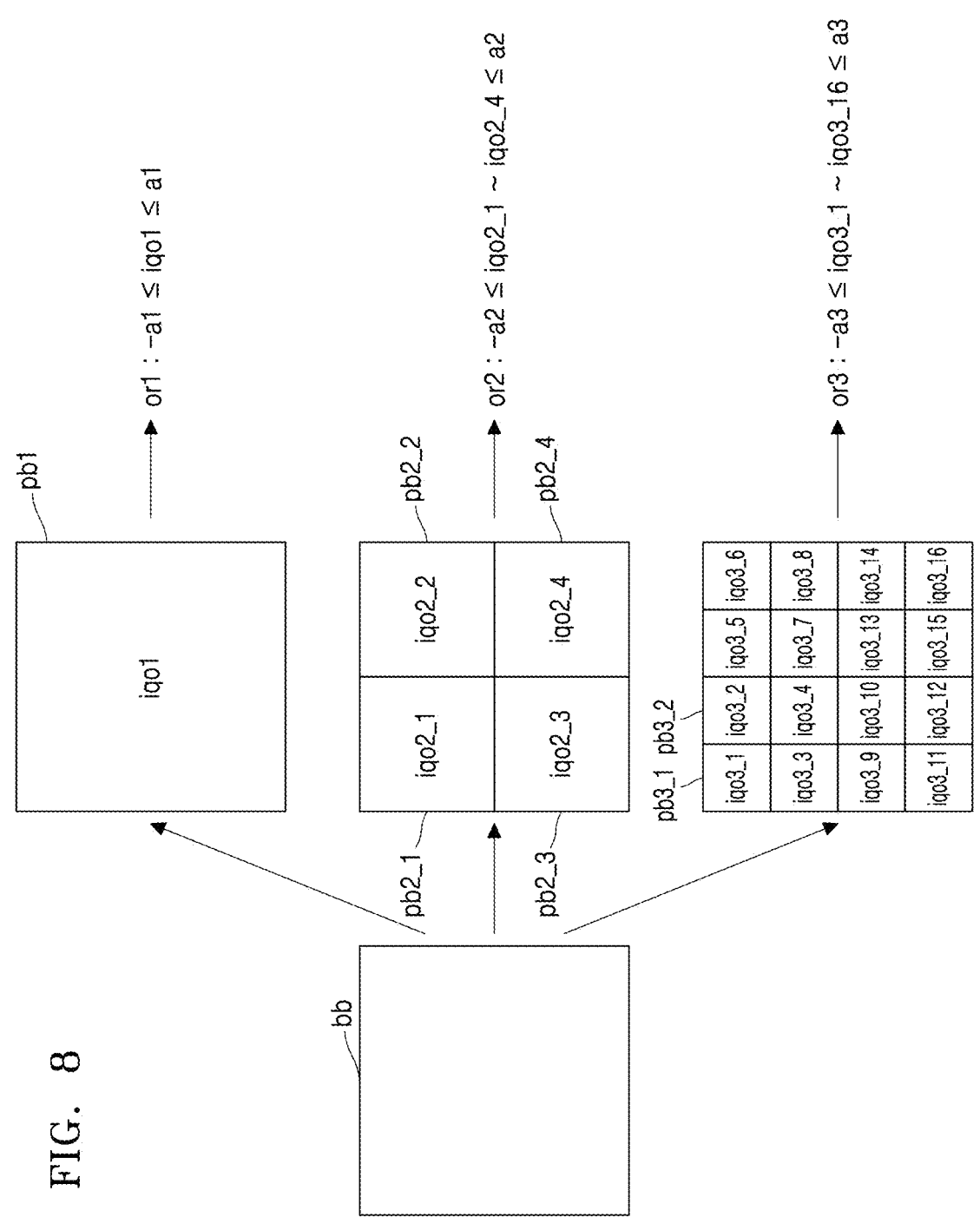
FIG. 8 is a diagram for describing offset ranges according to an example embodiment.

FIG. 8 is a diagram for describing offset ranges according to an example embodiment. In some embodiments, a quantization controller (e.g., the quantization controller 100 of FIG. 6) may set an offset range. Descriptions that are already provided above with reference to FIG. 7 will be omitted.

The quantization controller may generate final quantization offsets by adjusting the initial quantization offsets corresponding to the preliminary blocks to be included in the offset ranges according to the corresponding preliminary blocks, respectively. In detail, the offset adjuster (e.g., the offset adjuster 130 of FIG. 6) may generate a final quantization offset corresponding to each of the preliminary blocks based on an offset range according to the size of the preliminary block.

An offset range corresponding to each of the preliminary blocks may be set. For example, the offset range may be set according to the size of the preliminary block. Depending on the size of the preliminary block, the corresponding offset range may vary. The offset range may be set based on offset setting values a1, a2, and a3. The offset setting values may vary depending on the size of the preliminary block. For example, an offset setting value corresponding to the size of the first preliminary block pb1 may be the first offset setting value a1, an offset setting value corresponding to the size of the second preliminary block pb2 may be the second offset setting value a2, and an offset setting value corresponding to the size of the third preliminary block pb3 may be the third offset setting value a3.

Offset ranges for preliminary blocks having the same size may be equal to each other. For example, an offset range corresponding to a preliminary block having the same size as the first preliminary block pb1 may be a first offset range or1. The first offset range or1 may correspond to the first preliminary block pb1. The first offset range or1 may be from the negative of the first offset setting value (−a1) to the first offset setting value a1. The offset adjuster may adjust the first initial quantization offset iqo1 corresponding to the first preliminary block pb1 to be included in the first offset range or1 for the size of the first preliminary block.

An offset range corresponding to a preliminary block having the same size as the second preliminary block pb2 may be a second offset range or2. An offset range corresponding to each of the second preliminary block pb2_1, the second preliminary block pb2_2, the second preliminary block pb2_3, and the second preliminary block pb2_4 may be the second offset range or2. The second offset range or2 may be from the negative of the second offset setting value (−a2) to the second offset setting value a2. For example, the offset adjuster may adjust the second initial quantization offset iqo2_1 corresponding to the second preliminary block pb2_1 to be included in the second offset range or2. The offset adjuster may adjust the second initial quantization offset iqo2_2 corresponding to the second preliminary block pb2_2 to be included in the second offset range or2.

An offset range corresponding to a preliminary block having the same size as the third preliminary block pb3 may be a third offset range or3. An offset range corresponding to each of the third preliminary block pb3_1 and the third preliminary block pb3_2 may be the third offset range or3. The third offset range or3 may be from the negative of the third offset setting value (−a3) to the third offset setting value a3. For example, the offset adjuster may adjust the third initial quantization offset iqo3_1 corresponding to the third preliminary block pb3_1 to be included in the third offset range or3. The offset adjuster may adjust the third initial quantization offset iqo3_2 corresponding to the third preliminary block pb3_2 to be included in the third offset range or3. a1, a2, and a3 may be positive numbers.

In some embodiments, the quantization controller may adjust an offset range. The quantization controller may set the maximum value and the minimum value of the offset range. For example, the quantization controller may adjust the offset range based on at least one of MSE, SSIM, directed by Video Multimethod Assessment Fusion (dVMAF), and psycho visual distortion. For example, the quantization controller may obtain the offset setting values a1, a2, and a3 by using MSE.

As the size of a preliminary block decreases, the difference between the maximum value and the minimum value of an offset range corresponding to the preliminary block may decrease. The size of the first preliminary block pb1 may be greater than the size of the second preliminary block pb2, and the size of the second preliminary block pb2 may be greater than the size of the third preliminary block pb3.

In an example embodiment, as the size of a preliminary block decreases, the absolute values of the maximum value and the minimum value of an offset range corresponding to the preliminary block may decrease. The absolute values of the maximum value and the minimum value of the second offset range or2 may be less than the absolute values of the maximum value and the minimum value of the first offset range or1, respectively. The maximum value of the second offset range or2 may be the second offset setting value a2, and the minimum value may be the negative of the second offset setting value (−a2). The maximum value of the first offset range or1 may be the first offset setting value a1, and the minimum value may be the negative of the first offset setting value (−a1). The absolute values of the maximum value and the minimum value of the second offset range or2 may be the second offset setting value a2. The absolute values of the maximum value and the minimum value of the first offset range or1 may be the first offset setting value a1. The second offset setting value a2 may be less than the first offset setting value a1. For example, the first offset setting value a1 may be 4 or 6. The second offset setting value a2 may be 2 or 3. However, the first offset setting value a1 and the second offset setting value a2 are not limited to the above-described examples, and a1 may be set to various values greater than a2.

The absolute values of the maximum value and the minimum value of the third offset range or3 may be less than the absolute values of the maximum value and the minimum value of the second offset range or2, respectively. The maximum value of the third offset range or3 may be the third offset setting value a3, and the minimum value may be the negative of the third offset setting value (−a3). The maximum value of the second offset range or2 may be a2, and the minimum value may be −a2. The absolute values of the maximum value and the minimum value of the third offset range or3 may be the third offset setting value a3. The absolute values of the maximum value and the minimum value of the second offset range or2 may be the second offset setting value a2. The third offset setting value a3 may be less than the second offset setting value a2. For example, the third offset setting value a3 may be 1. However, the third offset setting value a3 is not limited to the above-described example, and the third offset setting value a3 may be set to various values less than the second offset setting value a2.

The encoding device according to various example embodiments may set an offset range such that, as the size of a preliminary block decreases, the absolute values of the maximum value and the minimum value of the offset range, thereby reducing distortion that occurs when encoding image data, and improving image quality.

Figure 9:
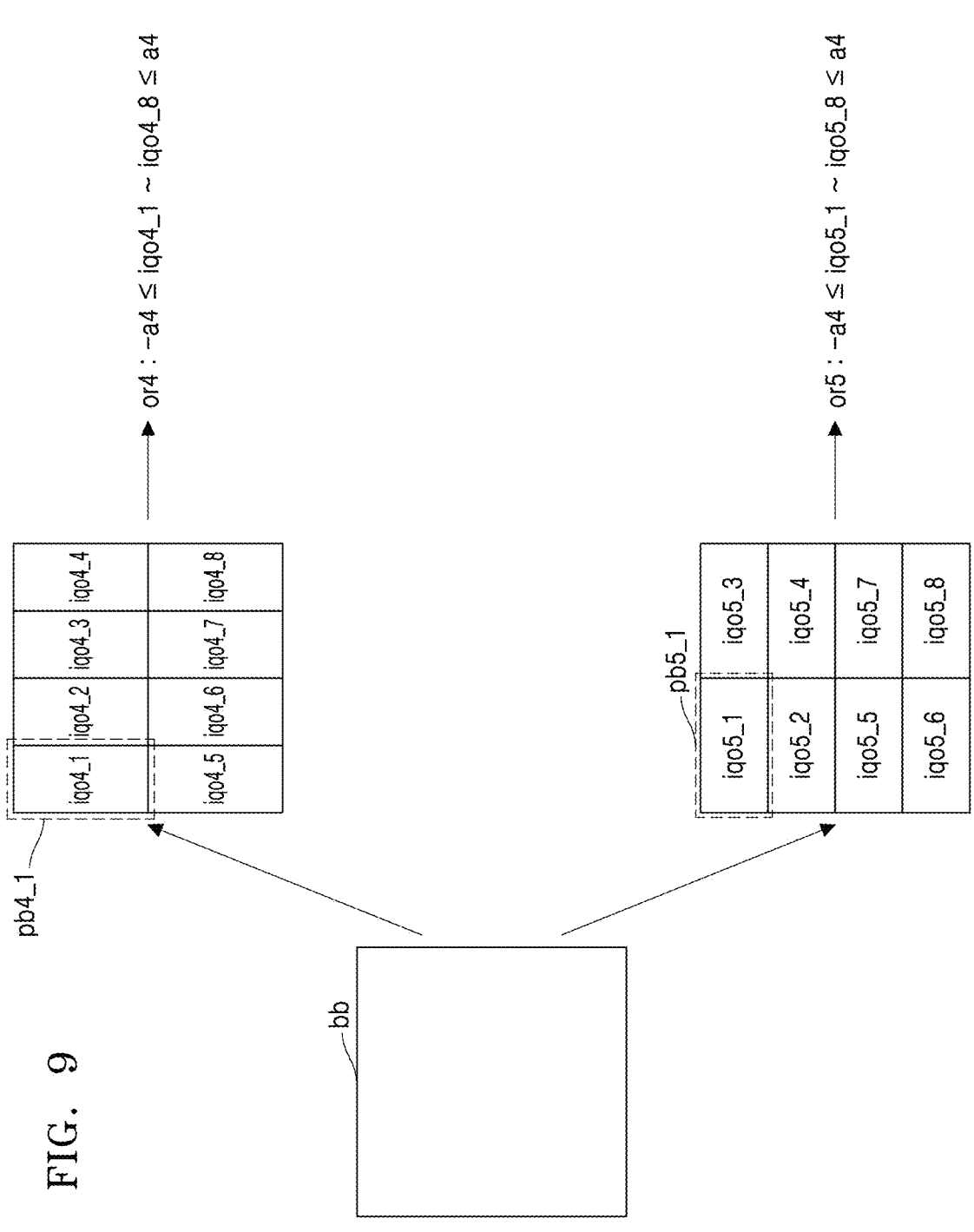
FIG. 9 is a diagram for describing offset ranges according to an example embodiment.

FIG. 9 is a diagram for describing offset ranges according to an example embodiment. In some embodiments, a quantization controller (e.g., the quantization controller 100 of FIG. 6) may set an offset range. FIG. 9 illustrates a case in which preliminary blocks have the same size and offset ranges are equal to each other. Descriptions that are already provided above will be omitted.

An offset range corresponding to each of the preliminary blocks may be set. For example, an offset range may be set according to the size of a preliminary block. Depending on the size of the preliminary block, the corresponding offset range may vary. The offset range may be set based on an offset setting value a4. A basic block bb may be partitioned according to a fourth sample block (e.g., the fourth sample block sb4 of FIG. 4) and fourth preliminary blocks pb4 may be generated. The basic block bb may be partitioned according to a fifth sample block (e.g., the fifth sample block sb5 of FIG. 4) and fifth preliminary blocks pb5 may be generated. FIG. 9 illustrates only the fourth preliminary blocks pb4 and the fifth preliminary blocks pb5, but this is for convenience of description, and the basic block bb may be partitioned into preliminary blocks having various sizes, and an offset range corresponding to each preliminary block may be set.

For example, an offset setting value corresponding to the size of the fourth preliminary block pb4 may be the fourth offset setting value a4. For example, the size of the fourth preliminary block pb4 may be 8×16 pixels. An offset range corresponding to a preliminary block having the same size as the fourth preliminary block pb4 may be a fourth offset range or4. The fourth offset range or4 may correspond to the fourth preliminary block pb4. The fourth offset range or4 may be from the negative of the fourth offset setting value (−a4) to the fourth offset setting value a4. For example, the offset adjuster may adjust a fourth initial quantization offset iqo4_1 corresponding to a fourth preliminary block pb4_1 to be included in the fourth offset range or4.

In an example embodiment, offset ranges corresponding to preliminary blocks having the same size may be equal to each other. For example, the size of the fifth preliminary block pb5 may be equal to the size of the fourth preliminary block pb4. For example, the size of the fifth preliminary block pb5 may be 16×8 pixels. An offset range corresponding to a preliminary block having the same size as the fifth preliminary block pb5 may be a fifth offset range or5. The fifth offset range or5 may correspond to the fifth preliminary block pb5. Because the size of the fifth preliminary block pb5 is equal to the size of the fourth preliminary block pb4, the fifth offset range or5 may be equal to the fourth offset range or4. The fifth offset range or5 may be from the negative of the fourth offset setting value (−a4) to the fourth offset setting value a4. For example, the offset adjuster may adjust a fifth initial quantization offset iqo5_1 corresponding to a fifth preliminary block pb5_1 to be included in the fifth offset range or5.

Figure 10:
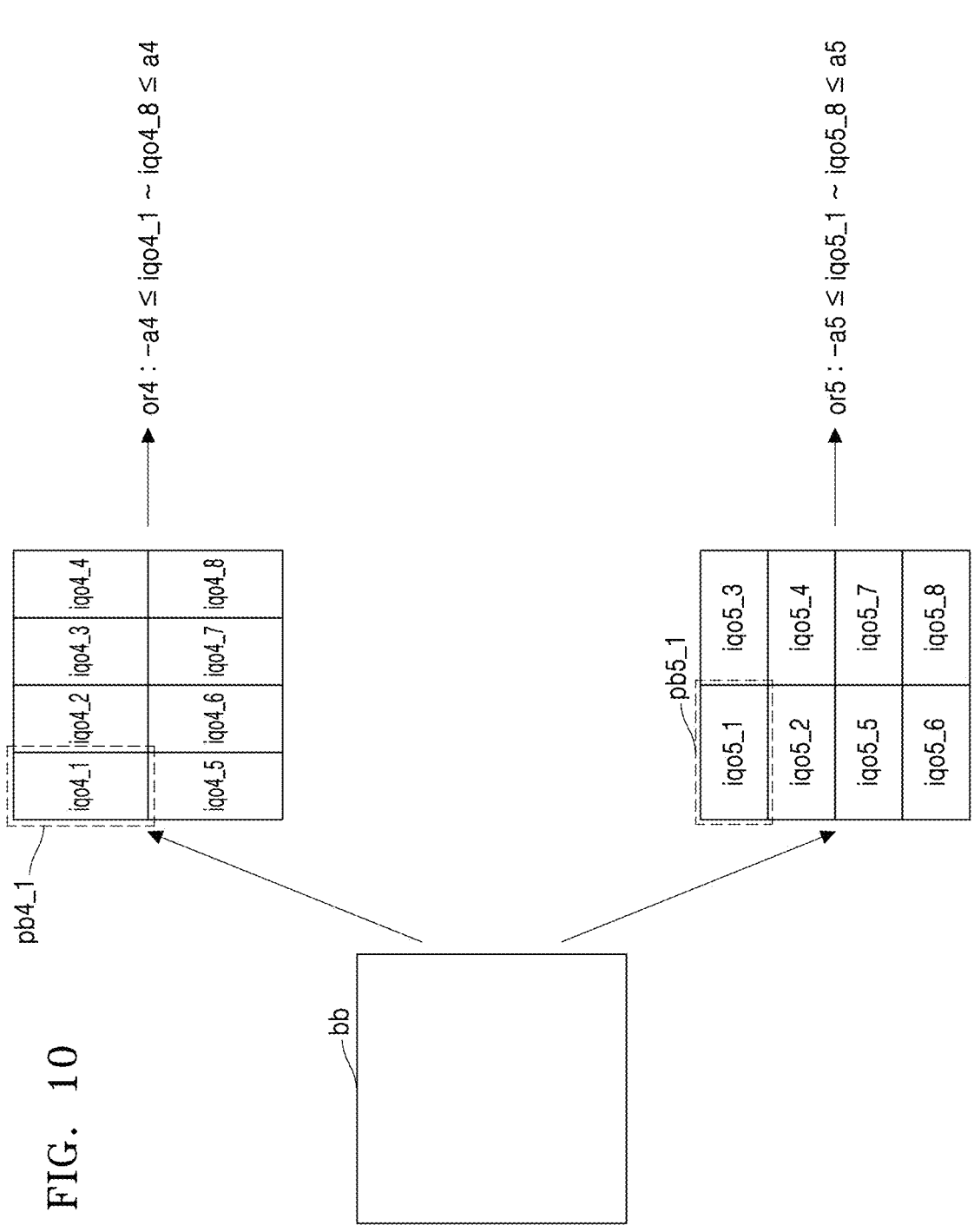
FIG. 10 is a diagram for describing offset ranges according to an example embodiment.

FIG. 10 is a diagram for describing offset ranges according to an example embodiment. FIG. 10 illustrates a case in which preliminary blocks have the same size but different shapes, and different offset ranges are set. Descriptions that are already provided above will be omitted.

In an example embodiment, an offset range corresponding to each of preliminary blocks may be set based on the size and shape of the preliminary block. When the preliminary blocks have the same size but different shapes, offset ranges may be different from each other. For example, the size of a fifth preliminary block pb5 may be equal to the size of a fourth preliminary block pb4, and the shape of the fifth preliminary block pb5 may be different from the shape of the fourth preliminary block pb4. For example, the fourth preliminary block pb4 may have a rectangular shape with a vertical length longer than the horizontal length, and the fifth preliminary block pb5 may have a rectangular shape with a horizontal length longer than the vertical length. Because the fifth preliminary block pb5 and the fourth preliminary block pb4 have the same size but different shapes, offset ranges respectively corresponding to the fourth preliminary block pb4 and the fifth preliminary block pb5 may be different from each other.

An offset range corresponding to a preliminary block having the same size and shape as the fifth preliminary block pb5 may be a fifth offset range or5. An offset setting value corresponding to the size and shape of the fifth preliminary block pb5 may be a fifth offset setting value a5. For example, the size of the fourth preliminary block pb4 may be 8×16 pixels. An offset range corresponding to the fifth preliminary block pb5 may be a fifth offset range or5. The fifth offset range or5 may be from the negative of the fifth offset setting value (−a5) to the fifth offset setting value a5. For example, the offset adjuster may adjust a fifth initial quantization offset iqo5_1 corresponding to a fifth preliminary block pb5_1 to be included in the fifth offset range or5. The fifth offset setting value a5 may be different from the fourth offset setting value a4.

Figure 11:
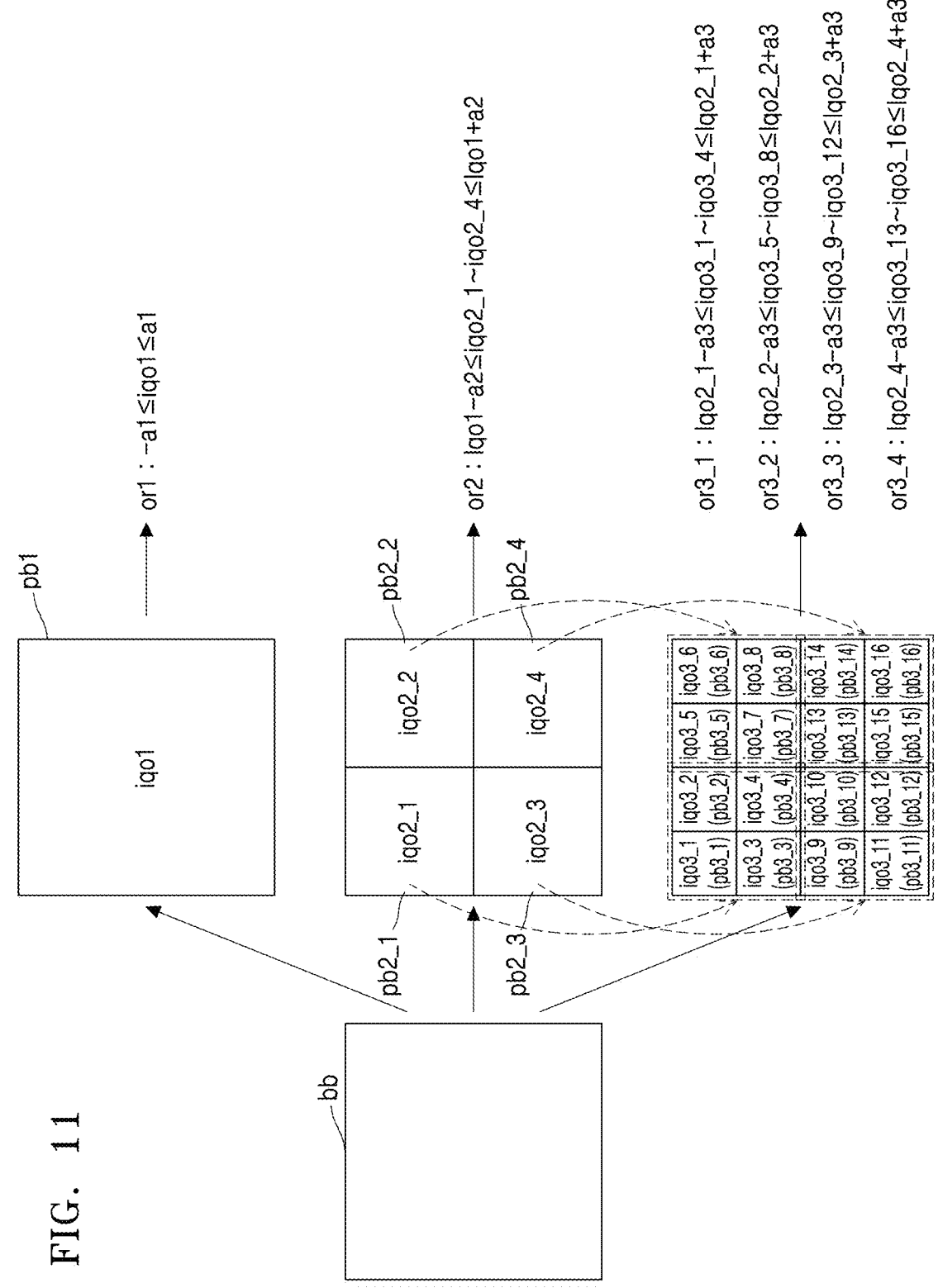
FIG. 11 is a diagram for describing offset ranges according to an example embodiment.

FIG. 11 is a diagram for describing offset ranges according to an example embodiment. In FIG. 11, an offset range may be set based on a final quantization offset. Descriptions that are already provided above will be omitted.

An offset range corresponding to each of preliminary blocks may be set. The offset range corresponding to each of the preliminary blocks may be set based on a final quantization offset. The offset range corresponding to each of the preliminary blocks may be set based on an offset setting value according to the size of the preliminary block, and the final quantization offset. The maximum value and the minimum value of the offset range corresponding to each of the preliminary blocks may be set based on the offset setting value according to the size of the preliminary block, and the final quantization offset.

In an example embodiment, the maximum value and the minimum value of an offset range corresponding to a target preliminary block may be set based on a final quantization offset corresponding to a reference block. The maximum value and the minimum value of the offset range corresponding to the target preliminary block may be set based on an offset setting value according to the size of the target preliminary block, and the final quantization offset corresponding to the reference block. The reference block may be a preliminary block corresponding to the target preliminary block and having a size greater than the block size of the target preliminary block. In an example embodiment, the reference block may be a preliminary block including the target preliminary block.

The maximum value and the minimum value of the offset range corresponding to the target preliminary block may be set by performing addition and subtraction on an offset setting value according to the size of the target preliminary block and a final quantization offset corresponding to the reference block, respectively. For example, when the target preliminary block is a first preliminary block pb1, there is no preliminary block having a size greater than that of the first preliminary block pb1, and thus, there may be no reference block of the first preliminary block pb1. When there is no reference block, the maximum value and the minimum value of the offset range corresponding to the target preliminary block may be set based on an offset setting value according to the size of the target preliminary block. The first offset range or1 may correspond to the first preliminary block pb1, and the first offset range or1 may be from the negative of the first offset setting value (−a1) to the first offset setting value a1. The offset adjuster may generate a first final quantization offset lqo1 by adjusting a first initial quantization offset iqo1 corresponding to the first preliminary block pb1 to be included in the first offset range or1 for the size of the first preliminary block.

For example, when the target preliminary block is a second preliminary block pb2_1, the first preliminary block pb1, which corresponds to the second preliminary block pb2_1 and has a large size, may be a reference block. The maximum value and the minimum value of an offset range corresponding to the second preliminary block pb2_1 may be set based on an offset setting value according to the size of the second preliminary block, and the first final quantization offset lqo1 corresponding to the first preliminary block pb1 that is the reference block. The second offset range or2 may correspond to the second preliminary block pb2_1, and the maximum value of the second offset range or2 may be a value obtained by summing up the second offset setting value a2 and the first final quantization offset lqo1, and the minimum value of the second offset range or2 may be a value obtained by subtracting the second offset setting value a2 from the first final quantization offset lqo1. The offset adjuster may generate a second final quantization offset lqo2_1 by adjusting the second initial quantization offset iqo2_1 corresponding to the second preliminary block pb2_1 to be included in the second offset range or2.

For example, when the target preliminary block is the second preliminary block pb2_2, the first preliminary block pb1 may be a reference block. The second offset range or2 may correspond to the second preliminary block pb2_2. The offset adjuster may generate a second final quantization offset lqo2_2 by adjusting the second initial quantization offset iqo2_2 corresponding to the second preliminary block pb2_2 to be included in the second offset range or2. Similarly to the method described above, the offset adjuster may generate a second final quantization offset lqo2_3 and a second final quantization offset lqo2_4 corresponding to the second preliminary block pb2_3 and the second preliminary block pb2_4, respectively.

For example, when the target preliminary block is a third preliminary block pb3_1, the second preliminary block pb2_1, which corresponds to the third preliminary block pb3_1 and has a large size, may be a reference block. The maximum value and the minimum value of an offset range corresponding to the third preliminary block pb3_1 may be set based on an offset setting value according to the size of the third preliminary block, and the second final quantization offset lqo2_1 corresponding to the second preliminary block pb2_1 that is the reference block. A third offset range or3_1 may correspond to the third preliminary block pb3_1, and the maximum value of the third offset range or3_1 may be a value obtained by summing up the third offset setting value a3 and the second final quantization offset lqo2_1, and the minimum value of the third offset range or3_1 may be a value obtained by subtracting the third offset setting value a3 from the second final quantization offset lqo2_1. The offset adjuster may generate a third final quantization offset lqo3_1 by adjusting a third initial quantization offset iqo3_1 corresponding to the third preliminary block pb3_1 to be included in the third offset range or3_1. Because the reference block of a third preliminary block pb3_2, a third preliminary block pb3_3, and a third preliminary block pb3_4 is the second preliminary block pb2_1, an offset range of the third preliminary block pb3_2, the third preliminary block pb3_3, and the third preliminary block pb3_4 may be the third offset range or3_1.

For example, when the target preliminary block is a third preliminary block pb3_5, the second preliminary block pb2_2, which corresponds to the third preliminary block pb3_5 and has a large size, may be a reference block. The maximum value and the minimum value of an offset range corresponding to the third preliminary block pb3_5 may be set based on an offset setting value according to the size of the third preliminary block, and the second final quantization offset lqo2_2 corresponding to the second preliminary block pb2_2 that is the reference block. A third offset range or3_2 may correspond to the third preliminary block pb3_5, and the maximum value of the third offset range or3_2 may be a value obtained by summing up the third offset setting value a3 and the second final quantization offset lqo2_2, and the minimum value of the third offset range or3_2 may be a value obtained by subtracting the third offset setting value a3 from the second final quantization offset lqo2_2. An offset range of a third preliminary block pb3_6, a third preliminary block pb3_7, and a third preliminary block pb3_8 may be the third offset range or3_2.

Similarly to the above-described method, because a reference block of third preliminary blocks pb3_9 to pb3_12 is the second preliminary block pb2_3, an offset range of the third preliminary blocks pb3_9 to pb3_12 may be a third offset range or3_3. Because a reference block of third preliminary blocks pb3_13 to pb3_16 is the second preliminary block pb2_4, an offset range of the third preliminary blocks pb3_13 to pb3_16 may be a third offset range or3_4.

Figure 12:
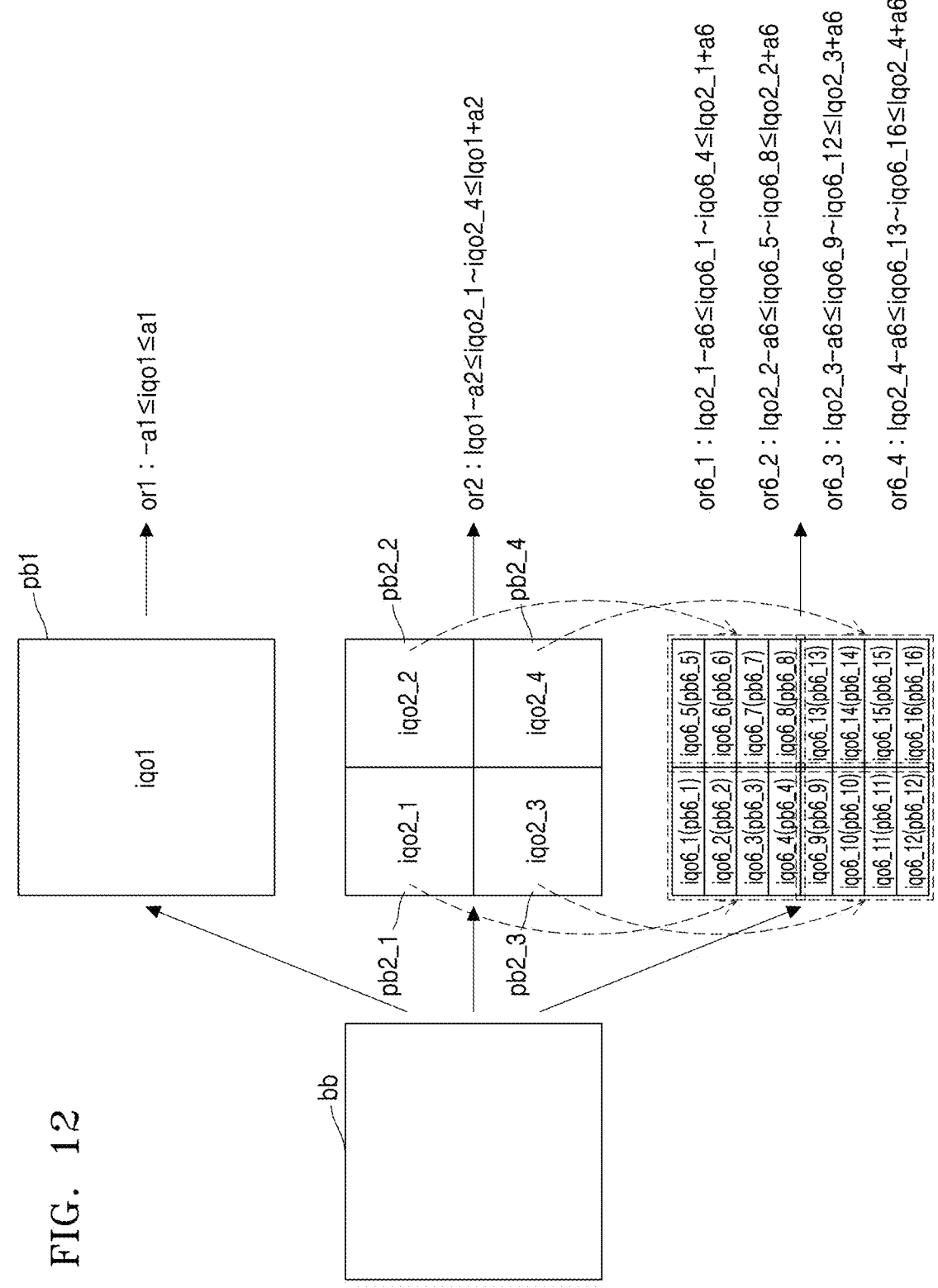
FIG. 12 is a diagram for describing offset ranges according to an example embodiment.

FIG. 12 is a diagram for describing offset ranges according to an example embodiment. In FIG. 12, a basic block bb may be partitioned into rectangular preliminary blocks, and thus, sixth preliminary blocks pb6 may be generated. An offset range may be set based on a final quantization offset. Descriptions that are already provided above with reference to FIG. 11 will be omitted.

In an example embodiment, the maximum value and the minimum value of an offset range corresponding to a target preliminary block may be set based on a final quantization offset corresponding to a reference block. The maximum value and the minimum value of the offset range corresponding to the target preliminary block may be set based on an offset setting value according to the size of the target preliminary block, and the final quantization offset corresponding to the reference block. In an example embodiment, the reference block may be a preliminary block including the target preliminary block. For example, the reference block may be a square-shaped preliminary block including the target preliminary block.

For example, when the target preliminary block is a sixth preliminary block pb6_1, a reference block corresponding to the sixth preliminary block pb6_1 may be a second preliminary block pb2_1. The second preliminary block pb2_1 may be a square-shaped preliminary block including the sixth preliminary block pb6_1. The maximum value and the minimum value of an offset range corresponding to the sixth preliminary block pb6_1 may be set based on an offset setting value according to the size of the sixth preliminary block, and a second final quantization offset lqo2_1 corresponding to the second preliminary block pb2_1 that is the reference block.

A sixth offset range or6_1 may correspond to the sixth preliminary block pb6_1, and the maximum value of the sixth offset range or6_1 may be a value obtained by summing up a sixth offset setting value a6 and a second final quantization offset lqo2_1, and the minimum value of the sixth offset range or6_1 may be a value obtained by subtracting the sixth offset setting value a6 from the second final quantization offset lqo2_1.

The offset adjuster may generate a sixth final quantization offset lqo6_1 by adjusting a sixth initial quantization offset iqo6_1 corresponding to the sixth preliminary block pb6_1 to be included in the sixth offset range or6_1. Because a reference block of a sixth preliminary block pb6_2, a sixth preliminary block pb6_3, and a sixth preliminary block pb6_4 is the second preliminary block pb2_1, an offset range of the sixth preliminary block pb6_2, the sixth preliminary block pb6_3, and the sixth preliminary block pb6_4 may be the sixth offset range or6_1.

For example, when the target preliminary block is a sixth preliminary block pb6_5, a reference block corresponding to the sixth preliminary block pb6_5 may be a second preliminary block pb2_2. The second preliminary block pb2_2 may be a square-shaped preliminary block including the sixth preliminary block pb6_5. The maximum value and the minimum value of an offset range corresponding to the sixth preliminary block pb6_5 may be set based on an offset setting value according to the size of the sixth preliminary block, and a second final quantization offset lqo2_2 corresponding to the second preliminary block pb2_2 that is the reference block.

A sixth offset range or6_2 may correspond to the sixth preliminary block pb6_5, and the maximum value of the sixth offset range or6_2 may be a value obtained by summing up the sixth offset setting value a6 and a second final quantization offset lqo2_2, and the minimum value of the sixth offset range or6_2 may be a value obtained by subtracting the sixth offset setting value a6 from the second final quantization offset lqo2_2. An offset range of a sixth preliminary block pb6_6, a sixth preliminary block pb6_7, and a sixth preliminary block pb6_8 may be the sixth offset range or6_2.

Similarly to the above-described method, because a reference block of sixth preliminary blocks pb6_9 to pb6_12 is the second preliminary block pb2_3, an offset range of the third preliminary blocks pb6_9 to pb6_12 may be a sixth offset range or6_3. Because a reference block of sixth preliminary blocks pb6_13 to pb6_16 is the second preliminary block pb2_4, an offset range of the sixth preliminary blocks pb6_13 to pb6_16 may be a sixth offset range or6_4.

Figure 13A:
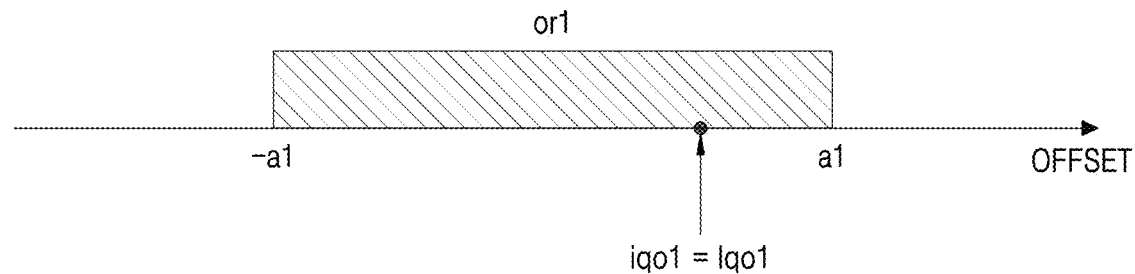
FIG. 13A is a diagram for describing a case in which an initial quantization offset is included in an offset range, according to an example embodiment.

FIG. 13A is a diagram for describing a case in which an initial quantization offset is included in an offset range, according to an example embodiment. In FIG. 13A, it is assumed that a target preliminary block is a first preliminary block, and an offset range corresponding to the first preliminary block is the first offset range or1. Hereinafter, FIG. 8 will be also referred.

Referring to FIGS. 13A and 8, the first offset range or1 may be from the negative of the first offset setting value (−a1) to the first offset setting value a1. A quantization controller (e.g., the quantization controller 100 of FIG. 6) may adjust the first initial quantization offset iqo1 corresponding to the first preliminary block pb1 to be included in the first offset range or1 for the size of the first preliminary block. In FIG. 13A, it is assumed that the first initial quantization offset iqo1 is included in the first offset range or1.

In an example embodiment, when, among initial quantization offsets, the initial quantization offset corresponding to the target preliminary block is included in an offset range corresponding to the target preliminary block, the quantization controller may generate a final quantization offset corresponding to the target preliminary block, as the initial quantization offset corresponding to the target preliminary block. For example, because the first initial quantization offset iqo1 corresponding to the first preliminary block pb1 is included in the first offset range or1, the quantization controller may generate a first initial quantization offset iqo1 corresponding to the first preliminary block pb1, as the first final quantization offset lqo1. In other words, the first final quantization offset lqo1 may be equal to the first initial quantization offset iqo1.

Figure 13B:
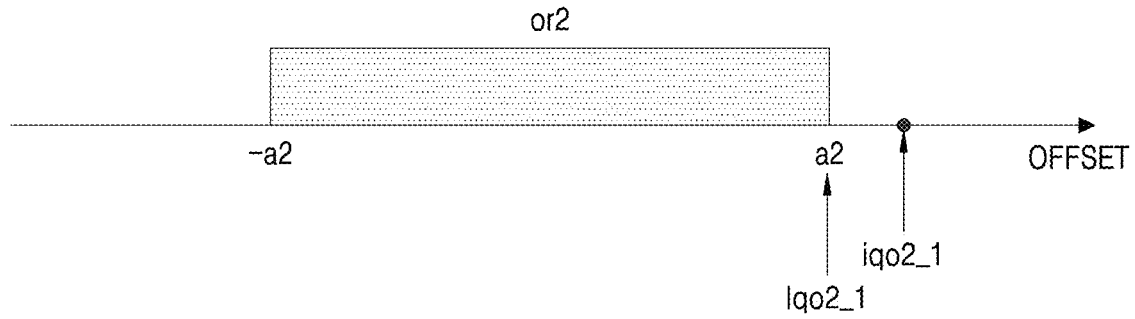
FIG. 13B is a diagram for describing a case in which an initial quantization offset is not included in an offset range, according to an example embodiment.

FIG. 13B is a diagram for describing a case in which an initial quantization offset is not included in an offset range, according to an example embodiment. In FIG. 13B, it is assumed that a target preliminary block is a second preliminary block, and an offset range corresponding to the second preliminary block is the second offset range or2. Descriptions that are already provided above will be omitted. Hereinafter, FIG. 8 will be also referred.

Referring to FIGS. 13B and 8, the second offset range or2 may be from the negative of the second offset setting value (−a2) to the second offset setting value a2. A quantization controller (e.g., the quantization controller 100 of FIG. 6) may adjust the second initial quantization offset iqo2_1 corresponding to the second preliminary block pb2_1 to be included in the second offset range or2 for the size of the second preliminary block. In FIG. 13B, it is assumed that the second initial quantization offset iqo2_1 is not included in the second offset range or2.

In an example embodiment, when, among initial quantization offsets, the initial quantization offset corresponding to the target preliminary block is not included in an offset range corresponding to the target preliminary block, the quantization controller may generate a final quantization offset as a value closer to the initial quantization offset corresponding to the target preliminary block from among the maximum value and the minimum value of the offset range corresponding to the target preliminary block. For example, the second initial quantization offset iqo2_1 corresponding to the second preliminary block pb2_1 may not be included in the second offset range or2. The maximum value of the second offset range or2 may be the second offset setting value a2, and the minimum value of the second offset range or2 may be the negative of the second offset setting value (−a2). Because the second initial quantization offset iqo2_1 is closer to the maximum value of the second offset range or2, the quantization controller may generate a second final quantization offset lqo2_1 corresponding to the second preliminary block pb2_1, as the second offset setting value a2.

Figure 14A:
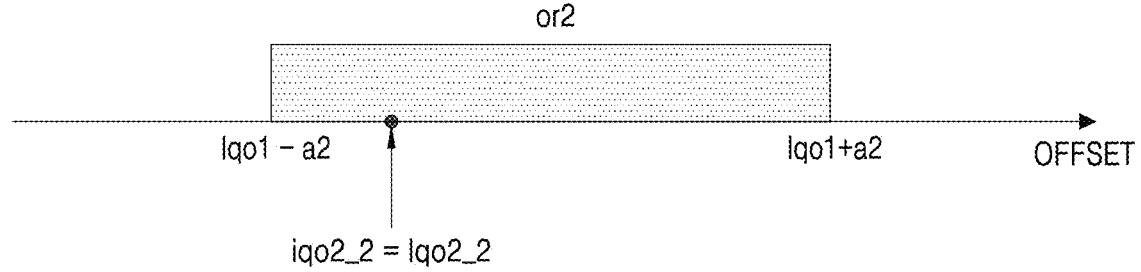
FIG. 14A is a diagram for describing a case in which an initial quantization offset is included in an offset range, according to an example embodiment.

FIG. 14A is a diagram for describing a case in which an initial quantization offset is included in an offset range, according to an example embodiment. In FIG. 14A, it is assumed that a target preliminary block is a second preliminary block, and an offset range corresponding to the second preliminary block is the second offset range or2. Hereinafter, FIG. 11 will be also referred.

Referring to FIGS. 14A and 11, the second offset range or2 may be from a value obtained by subtracting the second offset setting value a2 from the first final quantization offset lqo1 (lqo1−a2), to a value obtained by summing up the second offset setting value a2 and the first final quantization offset lqo1 (lqo1+a2). A quantization controller (e.g., the quantization controller 100 of FIG. 6) may adjust the second initial quantization offset iqo2_2 corresponding to the second preliminary block pb2_2 to be included in the second offset range or2.

For example, because the second initial quantization offset iqo2_2 corresponding to the second preliminary block pb2_2 is included in the second offset range or2, the quantization controller may generate a second initial quantization offset iqo2_2 corresponding to the second preliminary block pb2_2, as the second final quantization offset lqo2_2. In other words, the second final quantization offset lqo2_2 may be equal to the second initial quantization offset iqo2_2.

Figure 14B:
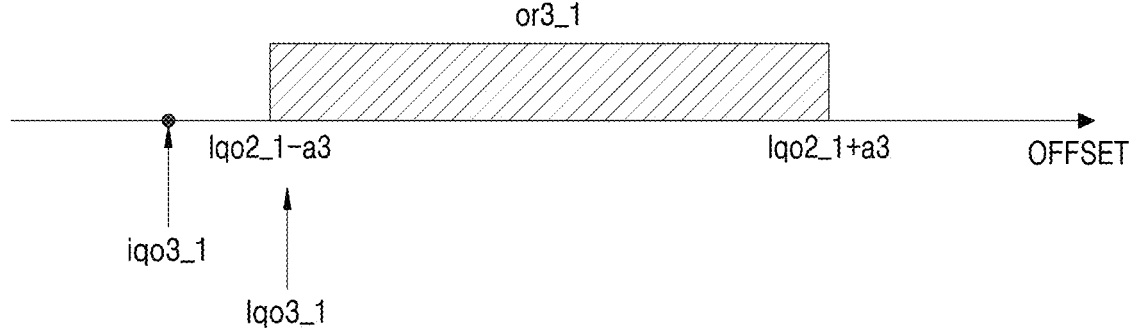
FIG. 14B is a diagram for describing a case in which an initial quantization offset is not included in an offset range, according to an example embodiment.

FIG. 14B is a diagram for describing a case in which an initial quantization offset is not included in an offset range, according to an example embodiment. In FIG. 14B, it is assumed that a target preliminary block is a third preliminary block, and an offset range corresponding to the third preliminary block is the third offset range or3_1. Hereinafter, FIG. 11 will be also referred.

Referring to FIGS. 14B and 11, the third offset range or3_1 may be from a value obtained by subtracting the third offset setting value a3 from the second final quantization offset lqo2_1 ((lqo2_1)−a3), to a value obtained by summing up the third offset setting value a3 and the second final quantization offset lqo2_1 ((lqo2_1)+a3). A quantization controller (e.g., the quantization controller 100 of FIG. 6) may adjust the third initial quantization offset iqo3_1 corresponding to the third preliminary block pb3_1 to be included in the third offset range or3_1.

For example, because the third initial quantization offset iqo3_1 corresponding to the third preliminary block pb3_1 is not included in the third offset range or3_1, the quantization controller may generate a third initial quantization offset iqo3_1 corresponding to the third preliminary block pb3_1, as the minimum value of the third offset range or3_1 ((lqo2_1)−a3).

Figure 15:
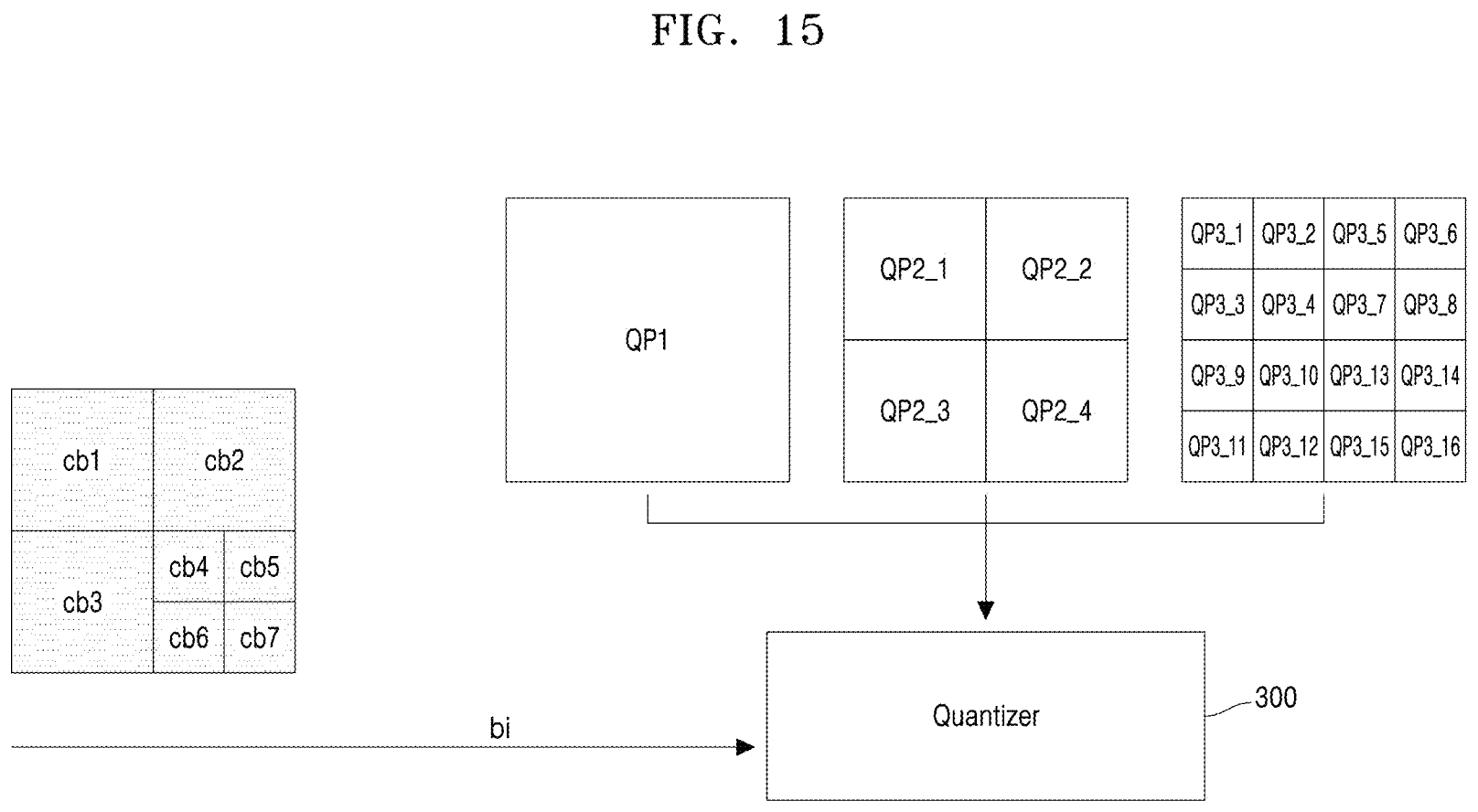

FIG. 15 is a diagram for describing operations of a quantizer according to an example embodiment. The quantizer 300 of FIG. 15 corresponds to the quantizer 300 of FIG. 5, and thus redundant descriptions thereof will be omitted.

The quantizer 300 may receive quantization parameters from a quantization controller (e.g., the quantization controller 100 of FIG. 5). The quantizer 300 may allocate the quantization parameters to corresponding coding blocks based on block information bi.

The quantizer 300 may match a target coding block to one of preliminary blocks to allocate a quantization parameter corresponding to the coding block. For example, when the target coding block is a first coding block cb1, the quantizer 300 may allocate a second quantization parameter QP2_1 as a quantization parameter of the first coding block cb1. The quantizer 300 may quantize the first coding block cb1 by using the second quantization parameter QP2_1. For example, when the target coding block is a fourth coding block cb4, the quantizer 300 may allocate a third quantization parameter QP3_13 as a quantization parameter of the fourth coding block cb4. The quantizer 300 may quantize the fourth coding block cb4 by using the third quantization parameter QP3_13.

Figure 16:
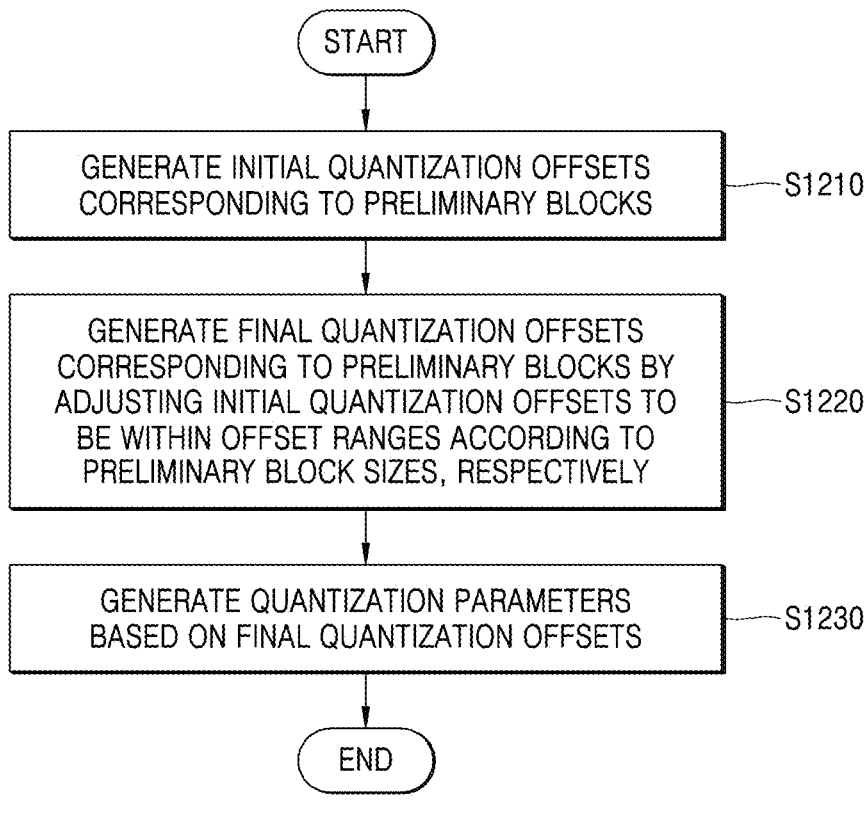
FIG. 16 is a flowchart illustrating an encoding method according to an example embodiment.

FIG. 16 is a flowchart illustrating an encoding method according to an example embodiment. In detail, FIG. 16 illustrates an operation method of an encoding device according to an example embodiment.

In operation S1210, the encoding device may generate initial quantization offsets corresponding to preliminary blocks into which image data is partitioned according to each of a plurality of preliminary block sizes. The encoding device may generate the initial quantization offsets based on a preset equation. In an example embodiment, the encoding device may generate the initial quantization offsets corresponding to the preliminary blocks, respectively, based on the variance of pixel values included in each of the preliminary blocks. However, various example embodiments are not limited thereto, and the encoding device may generate the initial quantization offsets by using an average value of the pixel values included in each of the preliminary blocks.

In operation S1220, the encoding device may generate final quantization offsets corresponding to the preliminary blocks by adjusting the initial quantization offsets to be included in offset ranges according to preliminary block sizes corresponding to the initial quantization offsets, respectively. An offset range corresponding to each of the preliminary blocks may be set.

The offset range may vary depending on the size of the preliminary block. As the size of a preliminary block increases, the difference between the maximum value and the minimum value of an offset range corresponding to the preliminary block may increase. For example, the size of a first preliminary block may be greater than the size of a second preliminary block, and a first offset range corresponding to the first preliminary block may be from a first value to a second value. A second offset range corresponding to the second preliminary block may be from a third value to a fourth value. The difference between the second value and the first value may be greater than the difference between the fourth value and the third value.

As the size of each preliminary block increases, an offset range corresponding to the preliminary block may increase. In an example embodiment, as the size of a preliminary block increases, the absolute values of the maximum value and the minimum value of an offset range corresponding to the preliminary block may increase. For example, the absolute value of each of the first value and the second value may be greater than the absolute value of each of the third value and the fourth value.

In an example embodiment, the offset range corresponding to each preliminary block may be set based on a final quantization offset. The encoding device may set the maximum value and the minimum value of an offset range corresponding to a target preliminary block based on a final quantization offset corresponding to a reference block. The maximum value and the minimum value of the offset range corresponding to the target preliminary block may be set based on an offset setting value according to the size of the target preliminary block, and the final quantization offset corresponding to the reference block. The reference block may be a preliminary block corresponding to the target preliminary block and having a size greater than the block size of the target preliminary block. The maximum value and the minimum value of the offset range corresponding to the target preliminary block may be set by performing addition and subtraction on an offset setting value according to the size of the target preliminary block and a final quantization offset corresponding to the reference block, respectively.

When, among initial quantization offsets, the initial quantization offset corresponding to the target preliminary block is included in an offset range corresponding to the target preliminary block, the encoding device may generate a final quantization offset corresponding to the target preliminary block, as the initial quantization offset corresponding to the target preliminary block. For example, it is assumed that a first offset range and a first initial quantization offset correspond to a first preliminary block, and the first initial quantization offset is included in the first offset range. Because the first initial quantization offset is included in the first offset range, the encoding device may generate a final quantization offset corresponding to the first preliminary block, as the first initial quantization offset.

When, among initial quantization offsets, the initial quantization offset corresponding to the target preliminary block is not included in an offset range corresponding to the target preliminary block, the encoding device may generate a final quantization offset as a value closer to the initial quantization offset corresponding to the target preliminary block from among the maximum value and the minimum value of the offset range corresponding to the target preliminary block. For example, it is assumed that a second offset range and a second initial quantization offset correspond to a second preliminary block, and the second initial quantization offset is not included in the second offset range. Because the second initial quantization offset is not included in the second offset range, the encoding device may adjust the second initial quantization offset. The encoding device may generate a final quantization offset corresponding to the second preliminary block, as a value closer to the second initial quantization offset from among the maximum value and the minimum value of the second offset range.

In operation S1230, the encoding device may generate quantization parameters based on the final quantization offsets. The encoding device may generate final quantization parameters corresponding to the respective preliminary blocks, and generate quantization parameters corresponding to the respective preliminary blocks by using the final quantization parameters. The encoding device may generate a quantization parameter based on a base quantization parameter and a final quantization offset. For example, the encoding device may generate each of the quantization parameters respectively corresponding to the preliminary blocks by summing up the final quantization offset corresponding to each of the preliminary blocks and the base quantization parameter corresponding to each of the preliminary blocks. The encoding device may allocate quantization parameters to corresponding coding blocks based on block information, and quantize image data by using allocated quantization parameters.

Figure 17:
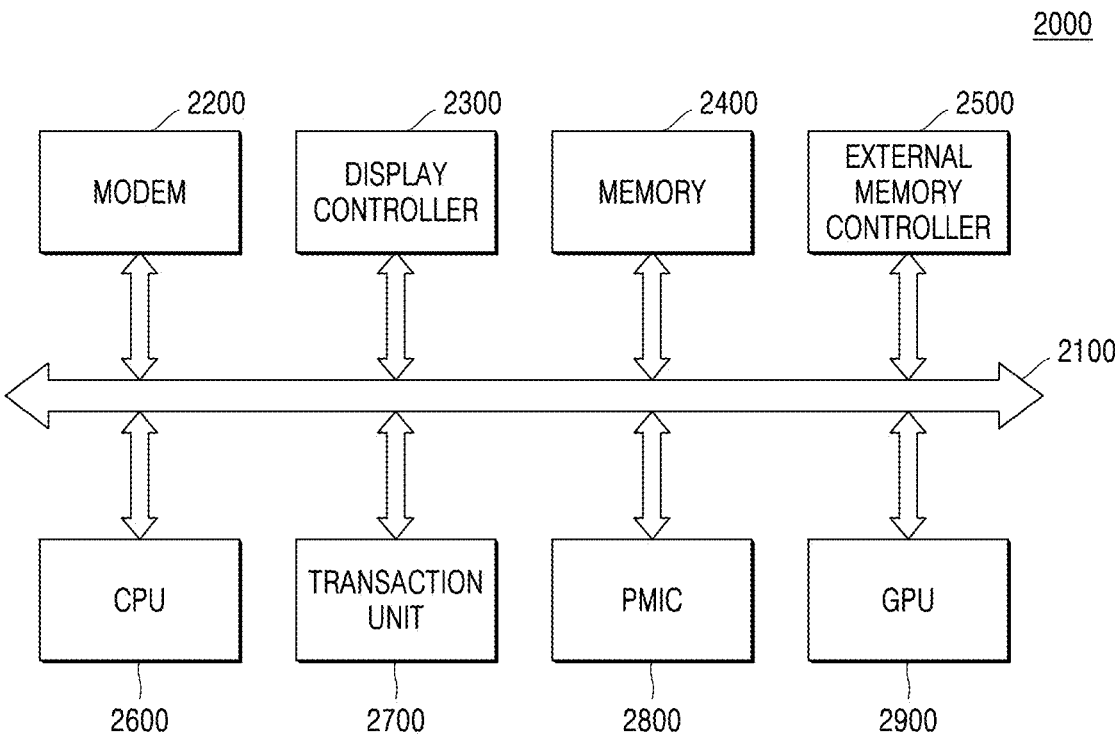
FIG. 17 is a block diagram illustrating a system on chip (SoC) according to an example embodiment.

FIG. 17 is a block diagram illustrating a system on chip (SoC) according to an example embodiment. An SoC 2000 is a semiconductor device, and may include an encoding device according to an example embodiment or may perform an encoding method according to an example embodiment.

The SoC 2000 is implemented by integrating complex functional blocks (e.g., intellectual property (IP)) for performing various functions into a single chip, and may include an encoding device according to an example embodiment and thus may generate encoded data for providing improved image quality, that is, a bitstream.

Referring to FIG. 17, the SoC 2000 may include a modem 2200, a display controller 2300, a memory 2400, an external memory controller 2500, a CPU 2600, a transaction unit 2700, a power management integrated circuit (PMIC) 2800, and a GPU 2900, and the functional blocks of the SoC 2000 may communicate with each other through a system bus 2100.

The CPU 2600 capable of controlling the overall operation of the SoC 2000 may control operations of other functional blocks 2200, 2300, 2400, 2500, 2700, 2800, and 2900. In an example embodiment, the CPU 2600 may execute instructions stored in the memory 2400 to perform an encoding method according to an example embodiment. For example, the CPU 2600 may generate a bitstream by encoding image data received from the external memory controller 2500, and deliver the generated bitstream to the modem 2200. For example, the CPU 2600 may generate a final quantization offset based on a offset range that varies depending on a block size. The CPU 2600 may generate a final quantization offset by adjusting an initial quantization offset corresponding to a target block to be included in an offset range corresponding to the target block. The CPU 2600 may generate a quantization parameter based on the final quantization offset, and encode the image data based on the quantization parameter.

The modem 2200 may demodulate a signal received from the outside of the SoC 2000, or may modulate a signal generated in the SoC 2000 and transmit the modulated signal to the outside. The external memory controller 2500 may control operations of transmitting and receiving data to and from an external memory device connected to the SoC 2000. For example, programs and/or data stored in the external memory device may be provided to the CPU 2600 or the GPU 2900 under control of the external memory controller 2500.

The GPU 2900 may execute program instructions related to graphics processing. The GPU 2900 may receive graphic data through the external memory controller 2500, and may transmit graphic data processed by the GPU 2900 to the outside of the SoC 2000 through the external memory controller 2500. In an example embodiment, the GPU 2900 may perform an encoding method according to an example embodiment. For example, the GPU 2900 may generate a bitstream by encoding image data received from the external memory controller 2500, and deliver the bitstream to the modem 2200.

The transaction unit 2700 may monitor a data transaction of each functional block, and the PMIC 2800 may control power supplied to each functional block under control of the transaction unit 2700. The display controller 2300 may control a display (or a display device) outside the SoC 2000 to transmit data generated in the SoC 2000 to the display.

The memory 2400 may include a non-volatile memory, such as electrically erasable programmable read-only memory (EEPROM), flash memory, phase-change random-access memory (PRAM), resistive RAM (RRAM), nano-floating gate memory (NFGM), polymer RAM (PoRAM), magnetic RAM (MRAM), or ferroelectric RAM (FRAM), or may include a volatile memory, such as dynamic RAM (DRAM), static RAM (SRAM), mobile DRAM, double data rate (DDR) synchronous DRAM (SDRAM), low-power DDR (LPDDR) SDRAM, graphics DDR (GDDR) SDRAM, or Rambus DRAM (RDRAM). The memory 2400 may store the above-described image data or bitstream.

Embodiments have been described herein and illustrated in the drawings. Although the embodiments have been described herein by using specific terms, they are used only for the purpose of explaining various example embodiments and not used to limit the meaning or scope of the claims. Therefore, those of skill in the art will understand that various modifications and other equivalent embodiments may be derived from the embodiments described herein. Therefore, the true technical protection scope of various example embodiments should be determined by the appended claims.

Any or all of the above example embodiments may adjust initial quantization offsets to be included in offset ranges corresponding to the preliminary blocks, which may reduce an amount of quantized image data and/or limit image degradation. In at least one example embodiment discussed above, a quantization controller, may transmit the adjusted (e.g. final) quantization parameters to a quantizer, which uses the quantization parameters to encode image data in a manner that may reduce an amount of quantized image data, while limiting image degradation.

Example embodiments have been described above with the aid of method steps illustrating the performance of specified functions and relationships thereof. The boundaries and sequence of these functional building blocks and method steps have been defined herein for convenience of description. Alternate boundaries and sequences can be defined, so long as the specified functions and relationships are appropriately performed. Any such alternate boundaries or sequences are thus within the scope and spirit of the claims.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While various example embodiments has been particularly shown and described with reference to embodiments thereof, it will be understood that various changes in form and details may be made therein without departing from the spirit and scope of the following claims.

What is claimed is:

1. An encoding device comprising:
   at least a first processor configured to implement a quantization controller configured to generate, for each of basic blocks constituting image data, quantization parameters for each of a plurality of sample blocks for partitioning the basic blocks; and
   the at least a first processor configured to implement a quantizer configured to quantize the image data based on at least one of the quantization parameters,
   wherein the quantization controller is further configured to generate initial quantization offsets corresponding to preliminary blocks generated by partitioning the image data according to each of the plurality of sample blocks, generate final quantization offsets corresponding to the preliminary blocks by adjusting the initial quantization offsets to be included in offset ranges corresponding to the preliminary blocks, respectively, wherein the offset ranges are set based on sizes of the preliminary blocks, and generate the quantization parameters based on the final quantization offsets.

2. The encoding device of claim 1, wherein the offset ranges are set based on sizes of the preliminary blocks and shapes of the preliminary blocks.

3. The encoding device of claim 1, wherein the quantization controller is further configured to, when an initial quantization offset corresponding to a target preliminary block among the initial quantization offsets is included in an offset range corresponding to the target preliminary block, generate a final quantization offset corresponding to the target preliminary block as an initial quantization offset corresponding to the target preliminary block.

4. The encoding device of claim 1, wherein the quantization controller is further configured to, when an initial quantization offset corresponding to a target preliminary block among the initial quantization offsets is not included in an offset range corresponding to the target preliminary block, generate a final quantization offset as a value closer to the initial quantization offset corresponding to the target preliminary block from among a maximum value and a minimum value of the offset range corresponding to the target preliminary block.

5. The encoding device of claim 1, further comprising the at least a first processor further configured to implement a predictor configured to partition the image data into coding blocks and perform a prediction process on the coding blocks,
   wherein the quantizer is further configured to receive block information indicating sizes and positions of the coding blocks from the predictor and allocate the quantization parameters to the corresponding coding blocks based on the block information.

6. The encoding device of claim 1, wherein the quantization controller is further configured to adjust the offset ranges based on at least one of mean square error (MSE), structural similarity index measure (SSIM), directed by Video Multimethod Assessment Fusion (dVMAF), and psycho visual distortion.

7. The encoding device of claim 1, wherein the quantization controller is further configured to generate the initial quantization offset based on a variance of pixel values included in each of the preliminary blocks into which the image data is partitioned according to each of the plurality of sample blocks.

8. The encoding device of claim 1, wherein, as a size of a preliminary block decreases, a difference between a maximum value and a minimum value of an offset range associated with the preliminary block decreases.

9. The encoding device of claim 8, wherein, as the size of the preliminary block decreases, an absolute value of the maximum value of the offset range and an absolute value of the minimum value of the offset range decrease.

10. The encoding device of claim 8, wherein the offset range associated with the preliminary block is set based on a final quantization offset associated with the preliminary block.

11. The encoding device of claim 10, wherein the maximum value and the minimum value of the offset range corresponding to a target preliminary block are set based on the final quantization offset corresponding to a reference block having a size greater than a block size of the target preliminary block.

12. An encoding device comprising:

at least a first processor configured to implement a quantization controller configured to generate a quantization parameter corresponding to a block into which image data is partitioned; and the at least a first processor configured to implement a quantizer configured to quantize the image data based on the quantization parameter, wherein the quantization controller is further configured to generate a final quantization offset from an initial quantization offset corresponding to the block, based on an offset range corresponding to the block, and generate the quantization parameter based on the final quantization offset, and the offset range varies depending on a size of a block corresponding to the initial quantization offset.

13. The encoding device of claim 12, wherein the quantization controller is further configured to, when the initial quantization offset is included in the offset range, generate the final quantization offset as the initial quantization offset.

14. The encoding device of claim 12, wherein the quantization controller is further configured to, when the initial quantization offset is not included in the offset range, generate the final quantization offset as a value closer to the initial quantization offset from among a maximum value and a minimum value of the offset range.

15. The encoding device of claim 12, wherein, as a size of the block increases, a difference between a maximum value and a minimum value of the offset range increases.

16. The encoding device of claim 15, wherein, as the size of the block increases, the offset range extends.

17. The encoding device of claim 15, wherein the maximum value and the minimum value of the offset range are set based on the final quantization offset corresponding to a block having a size greater than a size of a target block.

18. An operation method of an encoding device for generating quantization parameters, the operation method comprising:

generating initial quantization offsets corresponding to preliminary blocks generated by partitioning image data according to each of a plurality of sample blocks;

generating final quantization offsets corresponding to the preliminary blocks by adjusting the initial quantization offsets to be included in offset ranges corresponding to the preliminary blocks, respectively; and generating the quantization parameters based on the final quantization offsets, wherein the offset ranges vary depending on sizes of the preliminary blocks.

19. The operation method of claim 18, wherein the generating of the final quantization offsets comprises, when an initial quantization offset corresponding to a target preliminary block among the initial quantization offsets is included in an offset range corresponding to the target preliminary block, generating a final quantization offset corresponding to the target preliminary block as the initial quantization offset corresponding to the target preliminary block.

20. The operation method of claim 18, wherein the generating of the final quantization offsets comprises, when an initial quantization offset corresponding to a target preliminary block among the initial quantization offsets is not included in an offset range corresponding to the target preliminary block, generating a final quantization offset as a value closer to the initial quantization offset corresponding to the target preliminary block from among a maximum value and a minimum value of the offset range corresponding to the target preliminary block.

* * * * *